United States Patent
Ohsaki et al.

(10) Patent No.: US 6,842,255 B2
(45) Date of Patent: Jan. 11, 2005

(54) INTERFEROMETER AND INTERFERANCE MEASUREMENT METHOD

(75) Inventors: Yumiko Ohsaki, Tochigi (JP); Akiyoshi Suzuki, Tokyo (JP); Kenji Saitoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/116,924

(22) Filed: Apr. 5, 2002

(65) Prior Publication Data

US 2002/0176090 A1 Nov. 28, 2002

(30) Foreign Application Priority Data

Apr. 9, 2001 (JP) .................................... 2001-109999
Apr. 9, 2001 (JP) .................................... 2001-110000

(51) Int. Cl.⁷ ............................................... G01B 9/02
(52) U.S. Cl. ......................................... 356/513; 356/450
(58) Field of Search ........................ 356/511–515, 450, 356/495, 489

(56) References Cited

U.S. PATENT DOCUMENTS

| 4,536,086 A | * | 8/1985 | Shemwell ..................... 356/458 |
| 4,725,144 A | * | 2/1988 | Nelson et al. ............... 356/513 |
| 6,002,480 A | * | 12/1999 | Izatt et al. .................. 356/479 |
| 6,545,761 B1 | * | 4/2003 | Aziz et al. .................. 356/497 |
| 2003/0011783 A1 | * | 1/2003 | Suzuki et al. ............... 356/512 |

* cited by examiner

Primary Examiner—Andrew H. Lee
(74) Attorney, Agent, or Firm—Morgan & Finnegan, L.L.P.

(57) ABSTRACT

There is provided an interferometer for measuring a surface shape of an optical element using interference, including a reference wave-front deformation system for deforming a wave front of reference light.

13 Claims, 17 Drawing Sheets

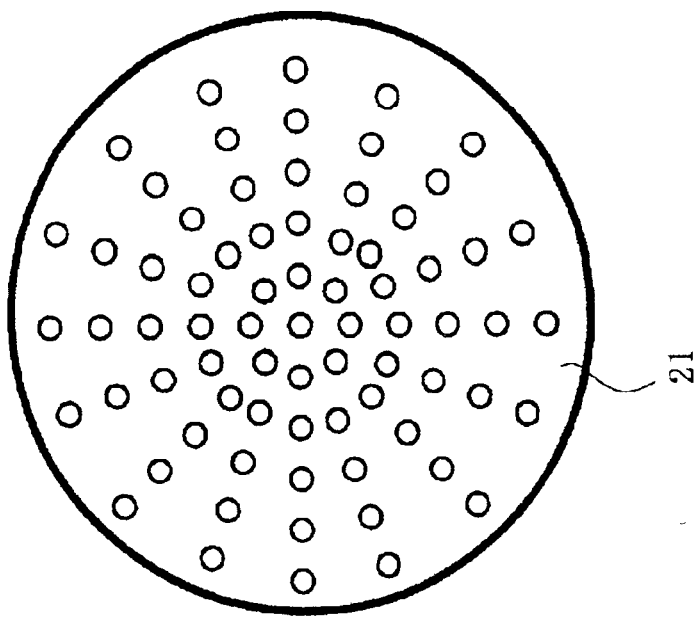
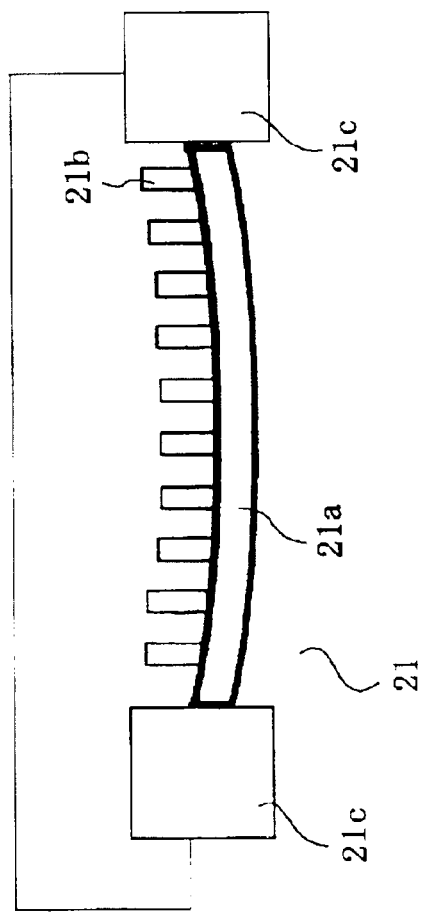
FIG. 2

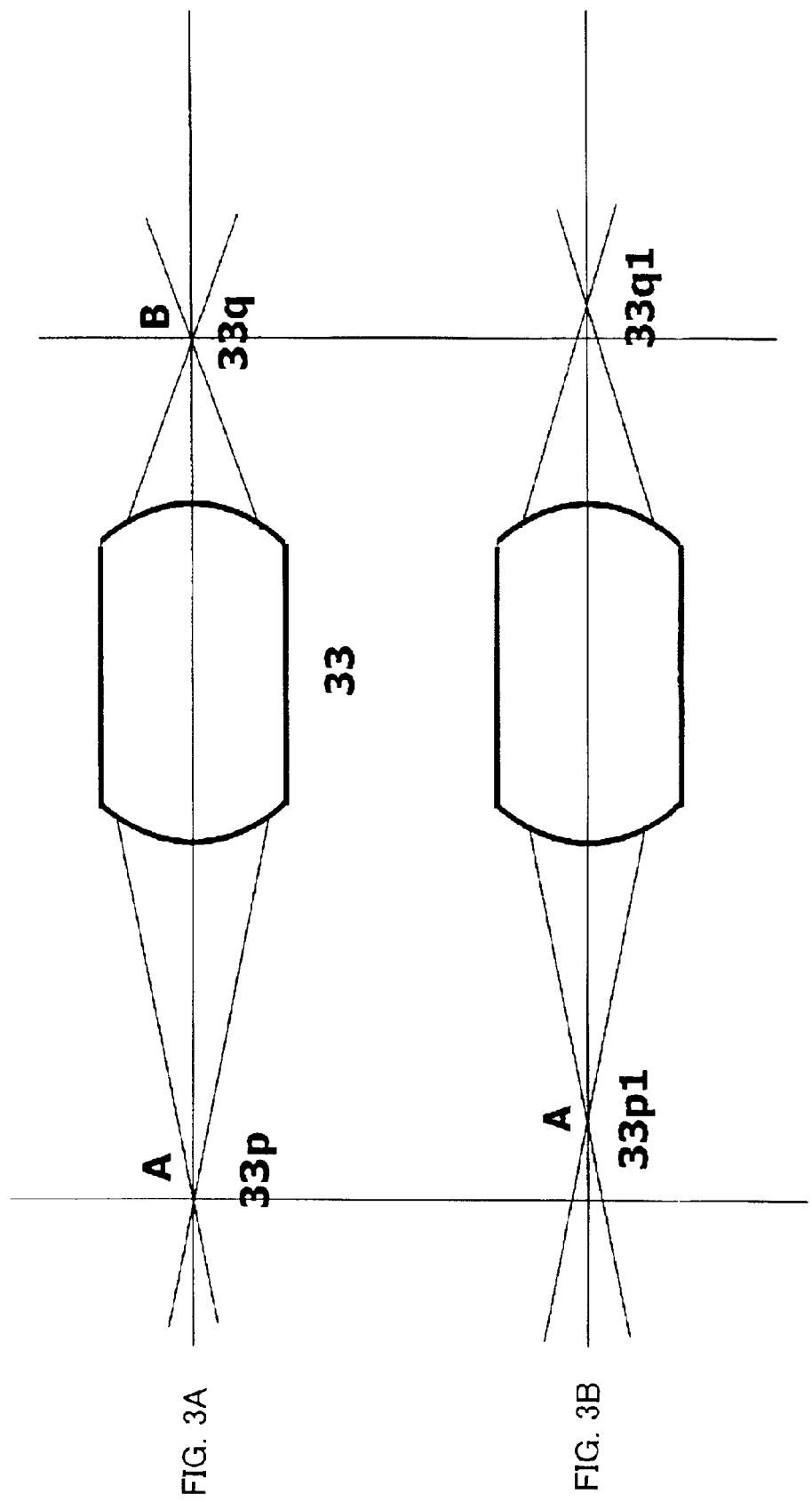

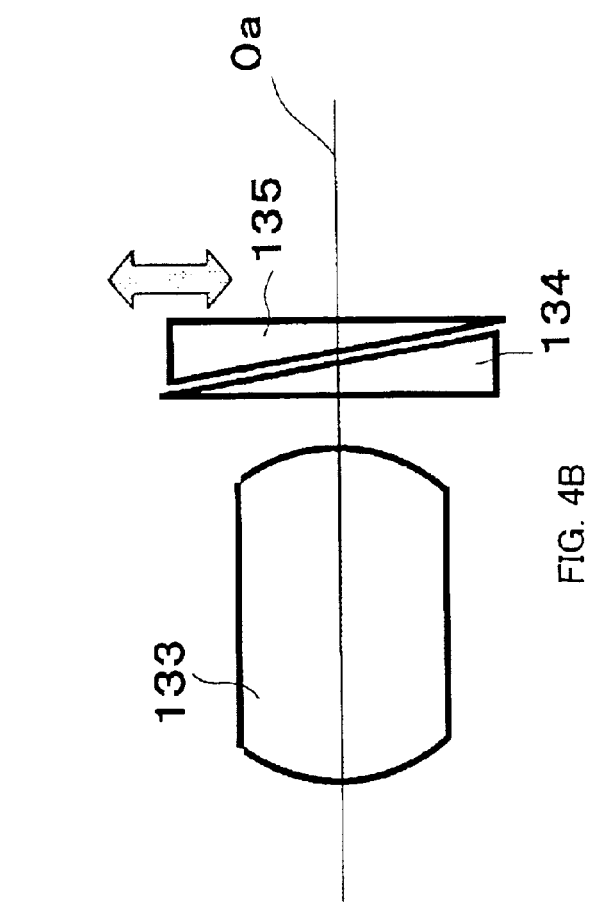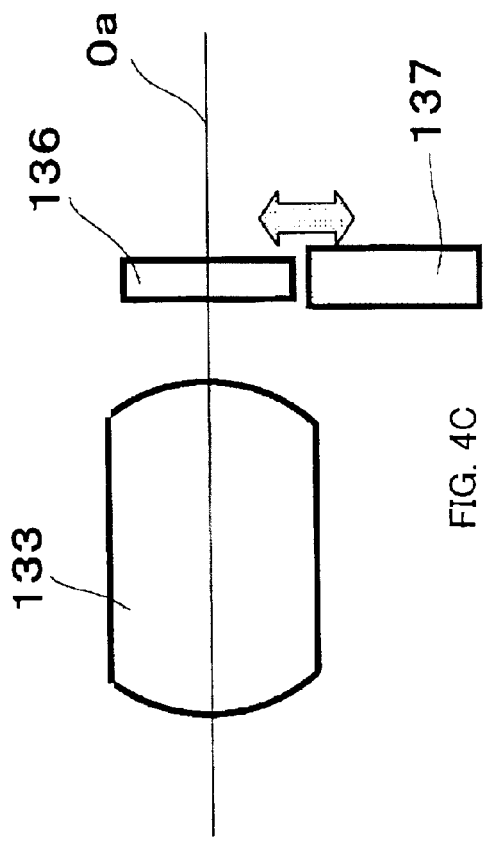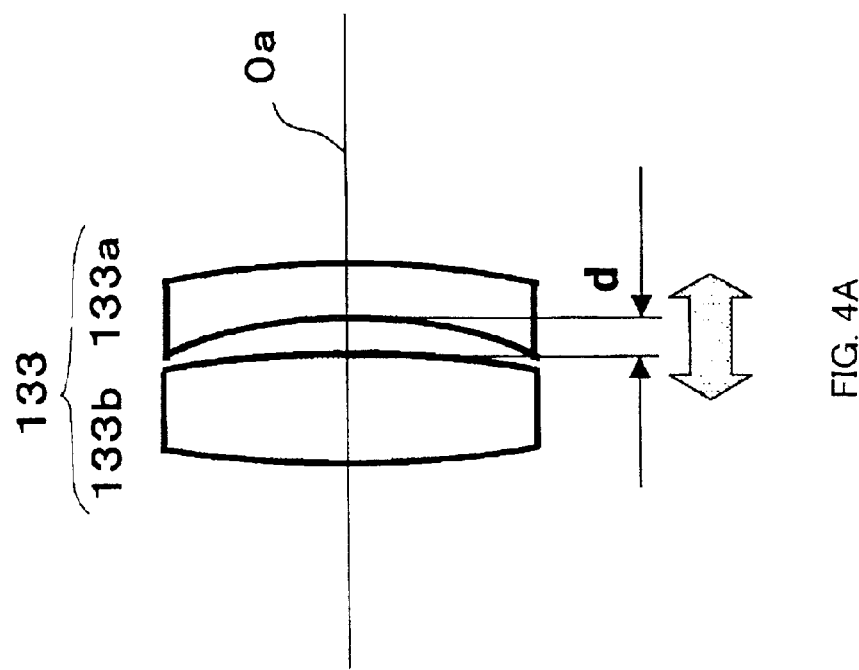

CONTROL OVER SHAPE OF ELASTICALLY DEFORMABLE MIRROR AS REFERENCE SURFACE

222a DATUM PLANE POSITION   221a REFERENCE PLANE POSITION

LOCATE PRIMARY STANDARD 222 AT DATUM PLANE POSITION

REPLACE PRIMARY STANDARD 222 WITH ELASTICALLY DEFORMABLE MIRROR 223 AND MATCH IT TO SHAPE OF REFERENCE PLANE

MATCH ELASTICALLY DEFORMABLE MIRROR 221 TO SAHPE OF DATUM PLANE

DEFORM ELASTICALLY DEFORMABLE MIRROR 221 TO DESIRED SHAPE WITHIN MEASURABLE RANGE OF INTERFEROMETER

MATCH ELASTICALLY DEFORMABLE MIRROR 223 TO SHAPE OF REFERENCE PLANE

DEFORM ELASTICALLY DEFORMABLE MIRROR 221 TO DESIRED SHAPE WITHIN MEASURABLE RANGE OF INTERFEROMETER

MATCH ELASTICALLY DEFORMABLE MIRROR 223 TO SHAPE OF REFERENCE PLANE

CONTINUE ALTERNATE DEFORMATION SO THAT SHAPE OF REFERENCE PLANE BECOMES DESIRED SHAPE

FIG. 13

INTERFEROMETER AND INTERFERANCE MEASUREMENT METHOD

BACKGROUND OF THE INVENTION

The present invention relates generally to apparatuses and methods for measuring a shape of a surface, and more particularly to an interferometer and an interference measurement method. The present invention is used suitably to measure, with high accuracy, a wide range of surface shapes from a spherical surface to an aspheric surface of a target object.

The present invention is also used suitably to measure, with high precision, surface shapes including a spherical surface, an aspheric surface, etc., of each optical element (e.g., a lens, a filter, etc.) in a projection optical system for use with a lithography process that transfers a pattern on a mask onto a photosensitive substrate, and manufactures a semiconductor device, etc.

Innovations in optical systems have always been promoted by introductions of a new optical element and/or a degree of freedom. Among them, recent developments in process and measurement methods have successfully applied optical performance improved by the advent of aspheric surfaces, which has been sought in astronomical telescopes, to semiconductor exposure apparatuses used to manufacture semiconductor devices, which require extremely high accuracy.

There are three major advantages in a semiconductor exposure apparatus using an aspheric surface: The first advantage is the reduced number of optical elements. An optical system in a semiconductor exposure apparatus has necessarily required such expensive materials, as quartz and fluorite, as it requires a shorter wavelength. The reduced number of optical elements as an advantage of the aspheric surface is remarkably preferable for manufacture and cost-reduction purposes. The second advantage is miniaturization. The size reduction as another advantage of the aspheric surface still has drastically promoted manufacture and cost reduction. The third advantage is high performance. Aspheric surfaces are expected to play a more important role to realize an optical system that has increasingly required the high-accuracy performance as a high numerical aperture ("NA") and low aberration advance.

A system using Extreme Ultra Violet ("EUV") light is the likeliest to be elected for an exposure method of next generation in view of recent accelerating demands for more minute patterns. The EUV system uses light having such a short wavelength as 13.4 nm, which is below one-tenth of a wavelength of light that has been used for conventional exposure, and a reflective image-forming optical system to transfer an image on a reticle onto a wafer. Wavelengths in the EUV range are too short for optical members (or transmissive materials) to transmit the EUV light, and the optical system uses only mirrors with no lenses. In addition, the EUV range restricts usable reflective materials, and mirror's reflectance for each surface becomes a little less than 70%. Therefore, such a structure as seen in conventional optical systems that use twenty or more lenses is not applicable in view of optical use efficiency. It is necessary to use optical elements as few as possible to form an image-forming optical system that meets desired performance.

Current EUV prototype machines use a three- or four-mirror system with an NA of about 0.10, but prospective systems are expected to use a six-mirror system with an NA of 0.25 to 0.30. As one solution for breaking down such a conventional wall and for realizing a high-performance optical system with fewer elements, it is the necessary technology to actually precisely process and measure aspheric surfaces so as to obtain an optical element with a predetermined surface shape.

However, even when a designed value provides high performance, a conventional aspheric-surface process disadvantageously has the limited measurement accuracy of the aspheric surface and cannot process a surface exceeding a predetermined aspheric surface amount, which is determined by a measurable range with desired precision. As is well known, the measurement and process are interrelated with each other; no precise process is available without good measurement accuracy.

The spherical-shape measurement is the most commonly used technology to measure optical elements, and there are many general-purpose apparatuses with advanced precision due to continuous endeavors toward precision improvement. However, it is difficult for the aspheric surface amount ten times as large as a measuring wavelength to keep the same measurement precision as the spherical measurement since an interval in an interference fringe is excessively small.

Usually, the Computer Generated Hologram ("CGH") and means for generating a wave front of a desired aspheric surface using a dedicated null lens have been well known as approaches to measure large aspheric surfaces. However, these conventional approaches have been found to be unavailable for an optical system for semiconductor exposure apparatuses, regardless of whether they have other applications, because manufacture precisions for the CGH or null lens are insufficient for the semiconductor exposure apparatuses, and the CGH uses diffracted light and arduously requires 0-order light process.

There has been known another approach for measuring aspheric surfaces using a mechanical or optical probe. Although a probe is so flexible that it is compatible with various shaped aspheric surfaces, the probe disadvantageously has measurement limits and exhibits instability during a positional measurement. Therefore, this approach hardly provides so precise as an interference measurement method.

One known method of measuring an aspheric shape uses a normal spherical-shape measuring interferometer to measure only a segment (which has usually a strap shape) where curvature radii on a spherical surface and an aspheric surface accord with each other, and then measures an entire surface by gradually changing a curvature radius to be measured. However, this method includes the following disadvantages:

A target optical system is often co-axial, and thus its optical element often has a rotational symmetry. In general, an aspheric shape is described only by terms of even orders as in an equation (1) below where r is a distance from an optical axis (or a radius or a moving radius), c is a curvature of paraxial spherical surface at the radius r in the optical-axis direction, and z is the optical-axis direction:

$$z = \frac{cr^2}{1 + \sqrt{1-(1+k)c^2r^2}} + Ar^2 + Br^6 + Cr^8 + Dr^{10} + Er^{12} + Fr^{14} + \quad (1)$$

$$Gr^{16} \approx \frac{1}{2}cr^2 + \left\{\frac{1}{8}c^3(1+K) + A\right\}r^4 + \left\{\frac{1}{16}c^5(1+K)^2 + B\right\}r^6 +$$

$$\left\{\frac{5}{128}c^7(1+K)^3 + C\right\}r^8 + \left\{\frac{7}{256}c^9(1+K)^4 + D\right\}r^{10}$$

Where K=A=B=C=D=0 in the equation (1), z becomes a spherical surface with a curvature radius R=1/c. Thus, an offset amount (or aspheric amount) 5 from the spherical surface is defined as a subtraction of the spherical surface from the equation (1), which is expanded and expressed only by terms of fourth or higher orders of the distance r as in the following equation (2):

$$\delta = \left\{\frac{1}{8}c^3 K + A\right\}r^4 + \left\{\frac{1}{16}c^5 K(2+K) + B\right\}r^6 + \qquad (2)$$
$$\left\{\frac{5}{128}c^7 K(3+3K+K^2) + C\right\}r^8 +$$
$$\left\{\frac{7}{256}c^9 K(4+6K+4K^2+K^3) + D\right\}r^{10}$$

The term of the fourth order of the distance r is particularly important for an aspheric amount. In this case, a usual reference side uses a plane mirror, and this offset amount δ corresponds to an offset of a wave front at the time of producing an interference fringe. When the offset amount δ exceeds ten times wavelength of measuring light, the measurement becomes difficult due to a too short interval between interference fringes.

BRIEF SUMMARY OF THE INVENTION

Accordingly, it is an exemplary object of the present invention to provide an interferometer and an interference measurement method, which are able to measure an aspheric shape using interference similar to the spherical-surface measurement, and properly measure various surface shapes.

Another exemplary object of the present invention is to provide an exposure apparatus using an optical element manufactured by using the above interferometer or the interference measurement method.

In order to achieve the above objects, an interferometer of one aspect of the present invention for measuring a surface shape of an optical element using interference includes a reference wave-front deformation system for deforming a wave front of reference light.

The reference wave-front deformation system may include an elastically deformable mirror that has a variable surface shape at a reference-light side and that can form a surface shape of the optical element. The reference wave-front deformation system may include the elastically deformable mirror and an identified datum plane at the reference-light side, and a surface deformed-amount monitor for monitoring a deformed amount of the elastically deformable mirror using interference information formed by beams from the elastically deformable mirror and the datum plane. A shape of the datum plane at the reference-light side may be invariable. A wavelength of a beam for interference used for the surface deformed-amount monitor may be the same as that of a beam used to measure a surface shape of the optical element. A wavelength of a beam for interference used for the reference wave-front deformation system may be different from that of a beam used to measure a surface shape of the optical element.

An interferometer of another aspect of the present invention for measuring a surface shape of an optical element using interference includes an elastically deformable mirror that has a variable surface shape, at a reference-light side, and a reference wave-front generating unit, at a object-light side, that may produce a wave front as a measurement reference of the surface shape.

The interferometer may use wave fronts from the elastically deformable mirror at the reference-light side and the reference wave-front generating unit at the object-light side to produce a desired aspheric wave front, and adjust the elastically deformable mirror and the reference wave-front generating unit so that a wave front of the reference light and a wave front of the object light may interfere with each other at an observation surface. The reference wave-front generating unit at the object-light side may generate low order components having a fourth order as a center of a moving radius of a wave front, while the elastically deformable mirror at the reference-light side may generate high order components having a sixth order and higher of the moving radius of the wave front.

The reference wave-front generating unit may include a spherical aberration generating part. The spherical aberration generating part includes a plurality of lenses, and generates spherical aberration by adjusting a separation between two of the plurality of lenses.

The reference wave-front generating unit may include an Alvarez lens. The Alvarez lens may adjust sixth-order components and higher of a moving radius of a wave front so that the components may be within a measurable range. There may be plural Alvarez lenses, the number of Alvarez lenses corresponding to the number of orders of a moving radius in a wave front to be corrected. The Alvarez lens may adjust fourth-order components and higher of a moving radius of a wave front so that the components may be within a measurable range.

The interferometer may further include a positional information monitor for monitoring positional information of an optical member that moves along an optical axis when the reference wave-front generating unit variably generates a wave front. The interferometer may further include a calculation part for calculating a wave front generated according to a moving amount of the optical member so as to use the calculated wave front as a reference wave front.

A wave front generated by the reference wave-front generating unit at the object-light side may have a different order of a moving radius from that of a wave front generated by the elastically deformable mirror at the reference-light side. The interferometer may further include an Alvarez lens at the reference-light side.

An interferometer of another aspect of the present invention for measuring a surface shape of an optical element using interference includes, at a reference-light side, two or more elastically deformable mirrors, each of which has a variable surface shape and thus can form a desired surface shape.

The interferometer may further include a primary standard at the reference-light side. The interferometer may further include an elastically deformed-amount monitoring interferometer between the elastically deformable mirror and the primary standard, or between two or more elastically deformable mirrors, wherein the elastically deformed-amount monitoring interferometer may include surface deformed-amount monitor for monitoring a deformed amount on a surface of the elastically deformable mirror. A surface shape of the primary standard located at the reference-light side may be invariable. A wavelength of a beam for interference used for the elastically deformed-amount monitoring interferometer may be different from that of a beam used to measure a surface shape of the optical element. A wavelength of a beam for interference used for the elastically deformed-amount monitoring interferometer is the same as that of a beam used to measure a surface shape of the optical element.

The interferometer may form a desired surface shape by alternately controlling deformations of these two or more elastically deformable mirrors while the elastically deformed-amount monitoring interferometer monitors these two or more elastically deformable mirrors. There may be plural primary standards, and the interferometer may alternately control deformations by selected a desired one of primary standards.

The interferometer may further include, at a object light side, a reference wave-front generating unit for generating a wave front as a measurement reference of the surface shape. The interferometer may use wave fronts from the elastically deformable mirror at the reference light side and the reference wave-front generating unit at the object side to generate a desired aspheric wave front, and adjust the elastically deformable mirror and the reference wave-front generating unit so that the aspheric wave front may be measurable at an observation surface.

The reference wave-front generating unit at the object side may generate low order components having a fourth order as a center of a moving radius, while the elastically deformable mirror at the reference light side may generate high order components having a sixth order and higher of a moving radius. The reference wave-front generating unit may include a spherical aberration generating part. The spherical aberration generating part may include a plurality of lenses, and generates spherical aberration by adjusting a separation between two of plurality of lenses.

The reference wave-front generating unit may include an Alvarez lens. The Alvarez lens may correct sixth-order components and higher of a moving radius of a wave front. There may be plural Alvarez lenses, the number of Alvarez lenses corresponding to the number of orders of a moving radius in the wave front to be corrected. The Alvarez lens may adjust fourth-order components and higher of a moving radius of a wave front. The interferometer may further include a positional information monitor for monitoring positional information of an optical member that moves along an optical axis when the reference wave-front generating unit variably generates a wave front. The interferometer may further include a calculation part for calculating a wave front generated according to a moving amount of an optical member so as to use the calculated wave front as a reference wave front.

A wave-front forming method according to still another aspect of the present invention for obtaining a desired wave front from a surface of a first or second elastically deformable mirror includes the steps of positioning the first elastically deformable mirror having a variable surface shape at a reference plane position, and a primary standard having an identified surface shape at a datum plane position, and varying a surface shape of the first elastically deformable mirror based on the surface shape of the primary standard using interference information between a first wave front from the surface of the first elastically deformable mirror and a reference wave front from a surface of the primary standard, positioning the second elastically deformable mirror having a variable surface shape at a datum plane position, and varying a surface shape of the second elastically deformable mirror based on the surface shape of the first elastically deformable mirror using interference information between the first wave front from the surface of the first elastically deformable mirror and a second wave front from the surface of the second elastically deformable mirror, and after changing the surface shape of the first elastically deformable mirror by a predetermined amount, deforming, necessary times n (n is a natural number), a surface shape of the second elastically deformable mirror based on the surface shape of the first elastically deformable mirror using interference information between the first wave front from the surface of the first elastically deformable mirror and the second wave front from the surface of the second elastically deformable mirror. A variance of the predetermined amount of the surface shape of the first elastically deformable mirror may be monitored by using the interference information between the first and second wave fronts, and made within a controllable range.

A wave-front forming method of still another aspect of the present invention for obtaining a desired wave front from a surface of a first or second elastically deformable mirror includes the steps of positioning the first elastically deformable mirror having a variable surface shape at a reference plane position, and the second elastically deformable mirror having a variable surface shape at a datum plane position, and varying a surface shape of the second elastically deformable mirror based on the surface shape of the first elastically deformable mirror using interference information between a first wave front from the surface of the first elastically deformable mirror and a second wave front from the surface of the second elastically deformable mirror, and after varying the surface shape of the first elastically deformable mirror by a predetermined amount, deforming, necessary times n (n is a natural number), the surface shape of the second elastically deformable mirror based on the surface shape of the first elastically deformable mirror using interference information between the first wave front from the surface of the first elastically deformable mirror and the second wave front from the surface of the second elastically deformable mirror. A variance of the predetermined amount of the surface shape of the first elastically deformable mirror may be monitored by using the interference information between the first and second wave fronts, and made within a controllable range.

An exposure apparatus using an optical element manufactured by using any one of the above interferometers constitutes one aspect of the present invention. In addition, an interference measurement method for measuring a surface shape of an optical element by using any one of the above interferometer also constitutes one aspect of the present invention.

Other objects and further features of the present invention will become readily apparent from the following description of preferred embodiments with reference to accompanying drawings.

BRIEF DESCRIPTION OF THE DRAWINGS

FIG. 2 is a view showing an elastically deformable mirror shown in FIG. 1.

FIG. 3 is a view showing a generation of spherical aberration from part shown in FIG. 1.

FIG. 4 is a view for explaining generations of various spherical aberrations of the present invention.

FIG. 13 is a view for explaining shape control over elastically deformable mirror as a reference plane shown in FIG. 11.

DETAILED DESCRIPTION OF THE PREFERRED EMBODIMENTS

Figure 1:
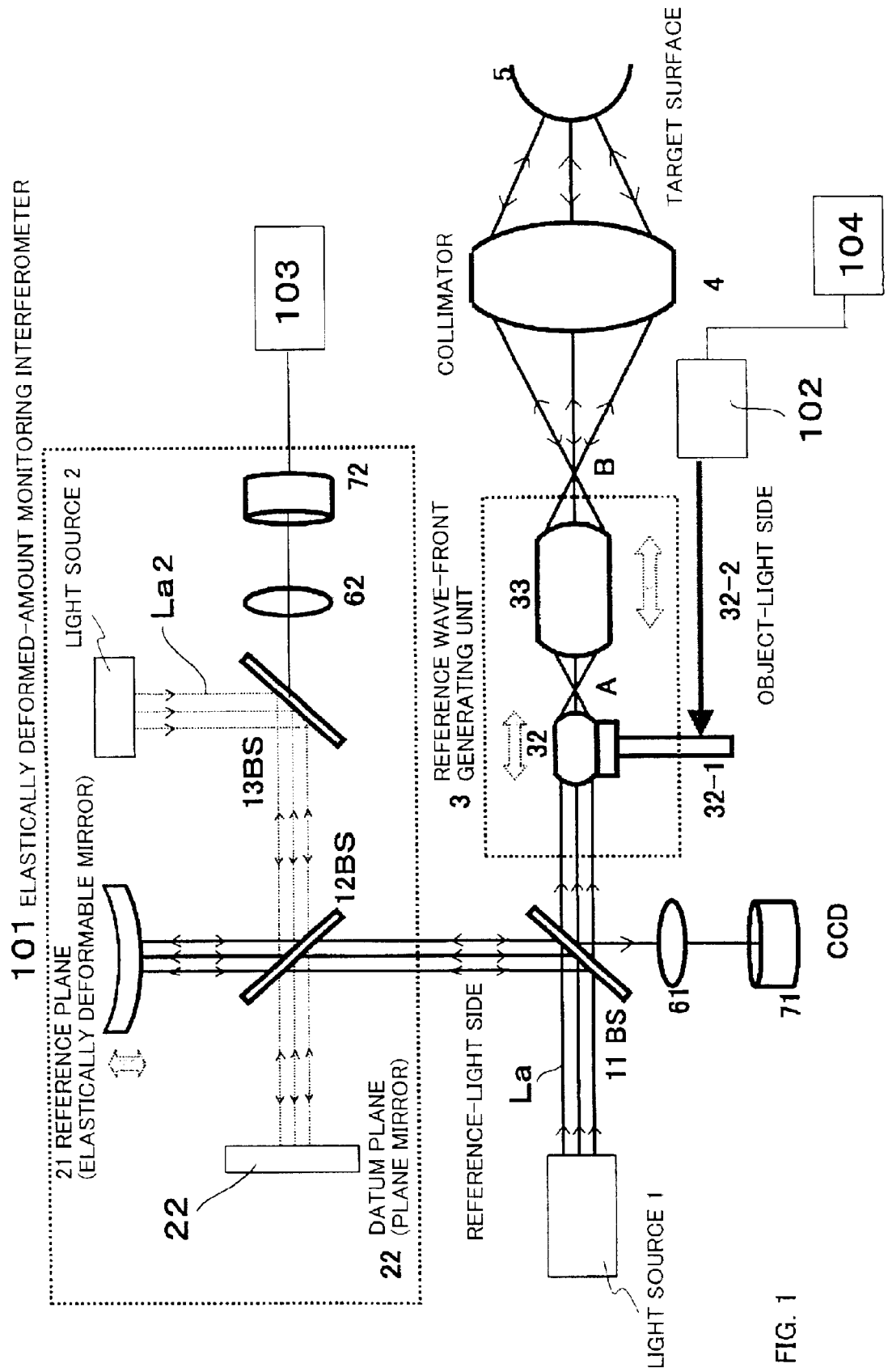
FIG. 1 is a schematic view showing essential parts in an aspheric-surface measuring interferometer of a first embodiment according to the present invention.

Normal, spherical-shape measuring interferometers have dramatically developed in precision and measuring reproducibility. The recent measuring reproducibility has demonstrated precision close to 0.1 nm, which is on a level acceptable to measurement apparatuses in the EUV era.

On the other hand, despite a demand of aspheric-surface measurements, measuring methods have not yet met a precision requirement due to lots of erroneous factors. Instant embodiments characteristically eliminate this difference in precision between a spherical-surface measurement and an aspheric-surface measurement. Specifically, the instant embodiments attempt to improve an achieved value in precision for the aspheric-surface measurement up to that for the spherical-surface measurement, and employ a structure that measures aspheric surfaces based on an optical arrangement for the spherical-surface measurement. Here, according to the instant embodiment, an aspheric surface is axially symmetrical but not a spherical surface or a plane, or is a non-cylindrical surface of a plane symmetry, not a cylindrical plane or a plane.

The instant embodiment creates an aspheric wave front by synthesizing reference-light and object-light wave fronts to each other. One or more elastically deformable mirrors produce the reference-light wave front while an optical system generates aberration to produce the object-light wave front.

The reference-light side uses one elastically deformable mirror, or two elastically deformable mirrors and a calibration-purpose primary-standard to freely form a shape, thereby producing a desired wave front. Various methods may be used to produce a reference wave front at the object-light side and a highly flexible system may be built by generating aberration in the optical system.

Recent development of highly precise drive control and computer in semiconductor manufacturing apparatuses enables to accurately predict aberration to be generated, after each element is driven by an open loop, from a reference position, only when aberration at the reference position is recognized. From the foregoing and a fact that an aspheric surface is defined from an offset from a spherical surface, the present embodiment regards an aspheric surface as aberration, and employs a structure that uses an aberration generating optical system (or reference wave-front generating unit) to generate an aberration amount, thereby generating a wave front having a desired aspheric shape. In other words, the instant embodiments characteristically produce an aspheric wave front accurately by means of synthesis.

One embodiment of the present invention provides a flexible interferometer that may detect arbitrary aspheric surface shapes without using a dedicated device.

One embodiment of the present invention has a system that deforms a wave front at the reference-light side and characteristically uses an elastically deformable mirror for deforming the wave front. In addition, it has a datum plane for monitoring a shape of the elastically deformable mirror at the reference-light side, and characteristically forms an elastically deformed-amount monitoring interferometer between the elastically deformable mirror and datum plane.

Figure 11:
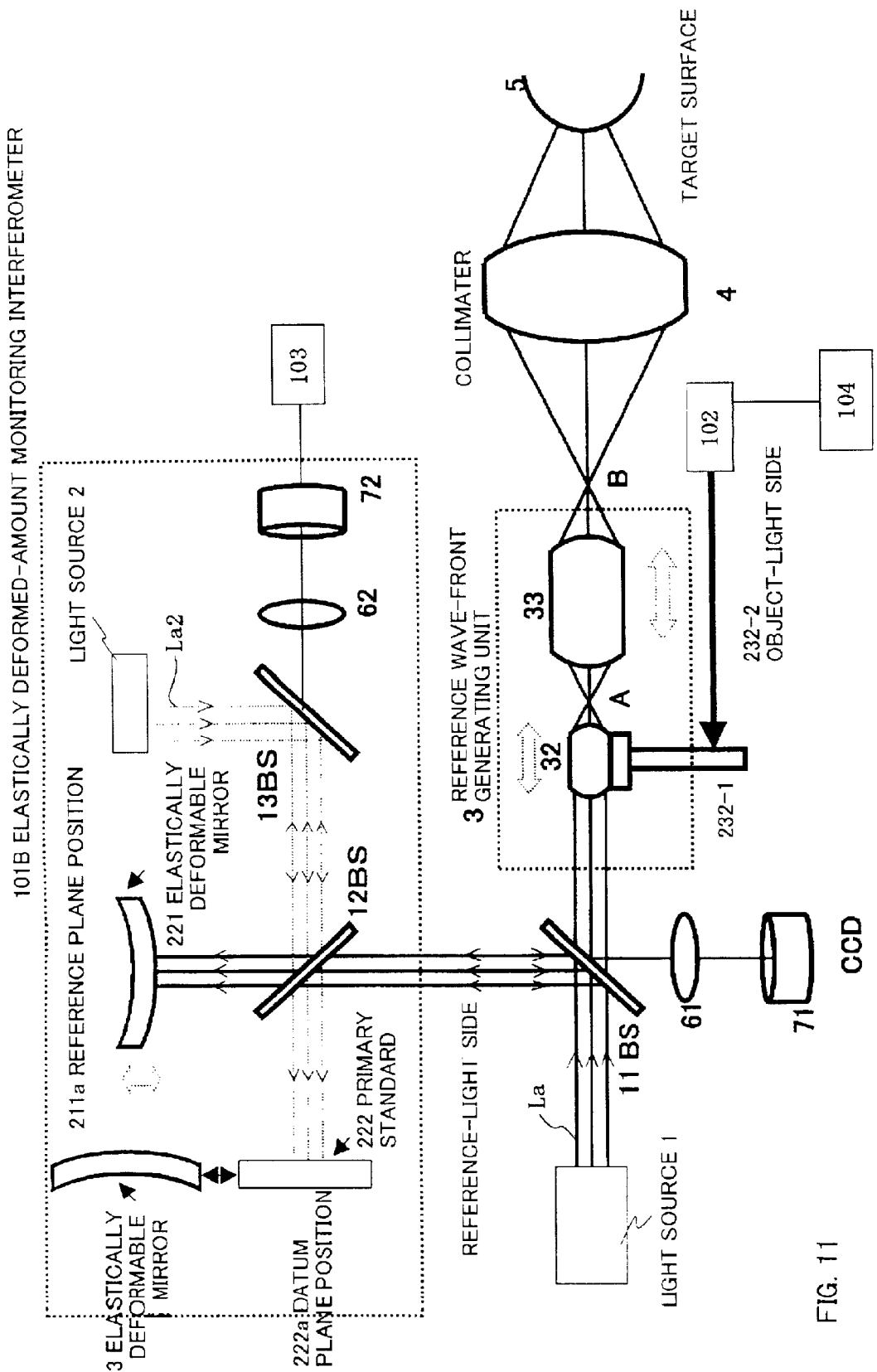
FIG. 11 is a schematic view showing essential parts in an aspheric-surface measuring interferometer of a sixth embodiment according to the present invention.

Another embodiment of the present invention uses two elastically deformable mirrors to deform a wave front at the reference-light side, and forms a desired reference-plane wave front by deforming both surface shapes. As shown in FIG. 11, these two elastically deformable mirrors are respectively located at a reference-plane position and a datum-plane position, an interferometer (i.e., elastically deformed-amount monitoring interferometer) is formed so as to control their elastically deformed amount. In other words, the elastically deformed-amount monitoring interferometer measures deformed amounts of these two elastically deformable mirrors, and alternate controls are provided with their deformed amounts in a permissible range for the interferometer. As a result, a desired reference-plane shape is finally created.

Moreover, a wave front generated by controlling the elastically deformable mirror at the reference-light side and a wave front generated at the object-light side are used to measure various aspheric surfaces.

The elastically deformable mirror used at the reference-light side may structurally deform its mirror shape (or surface shape) freely, for example, using an actuator or piezoelectric element to control a thin glass plate. Use of this elastically deformable mirror as a reference plane may create a desired reference wave front.

In order to monitor a surface shape of this elastically deformable mirror, a datum plane (e.g., a plane mirror, spherical and aspheric primary-standards) is provided, and an interferometer including this elastically deformable mirror and the datum plane monitors the deformed amount with satisfactory accuracy. A wavelength different from the measurement wavelength is used to monitor a surface shape and deformed amount of the elastically deformable mirror, as well as measuring an aspheric surface shape. The same wavelength as the measurement wavelength may be used to monitor the surface shape of the elastically deformable mirror.

Another embodiment described with reference to FIG. 11 uses two elastically deformable mirrors at the reference-light side and provides a primary standard having an identified shape at the datum plane position so as to control the deformed amount of the elastically deformable mirror as the reference plane. Specifically, an interferometer (or elastically deformed-amount monitoring interferometer) including the elastically deformable mirror located at the reference plane and the primary standard located at the datum plane turns a shape of the elastically deformable mirror at the reference plane into that of the primary standard. After this calibration between the elastically deformable mirror and the primary standard, the primary standard located at the datum plane position is replaced with the elastically deformable mirror. The interferometer recognizes surface shapes of two elastically deformable mirrors. The surface shapes of both members are alternately changed within a measurable range, so that the reference-light elastically deformable mirror may produce a desired wave front. The wavelength used for this elastically deformed-amount monitoring interferometer is different from that used to measure the aspheric surface shape. Thereby, the aspheric surface shape may be measured while the elastically deformed amount is monitored. The same wavelength as the measurement wavelength may be used to monitor the surface shape of the elastically deformable mirror.

On the other hand, the object-light side produces the wave front as a measurement reference of an aspheric surface shape. The reference wave front generating unit produces the reference wave front by controlling aberration in the optical system.

Next follows a description of a generation of a reference wave front using aberration in the optical system at the object-light side. The reference wave-front generating unit independently controllably forms each order of an aspheric surface shape that characterizes an aspheric surface by generating spherical aberration and using a combination with an Alvarez lens.

A target optical system is often co-axial, and thus its optical element often has a rotational symmetry. Therefore, an offset from a spherical surface is usually represented by terms of even orders higher than the fourth power of R where R is a distance from an optical axis (or the moving radius). A term of R's fourth power is particularly important, and a term of the fourth power corresponds to spherical aberration. Accordingly, the reference wave-front generating unit intentionally generates the spherical aberration by a desired value so as to form a wave front corresponding to a component, which the aspheric shape possesses. However, in general, it is often difficult to represent the aspheric surface using only by R's forth power. Accordingly, controllable aberrations are generated so as to synthesize a wave front that constitutes a desired aspheric surface by using the Alvarez lens for each order with respect to terms of higher orders than the fourth power. The Alvarez lens may generate all the wave fronts higher than the fourth order.

Some embodiments of the present invention produce aspheric wave fronts at the reference-light side and the object-light side, respectively, and may measure arbitrary aspheric surface shape as a result of interference between the wave fronts at an observation surface. Characteristically, one elastically deformable mirror arbitrarily deforms a reference-light wave front, or a desired wave front may be formed by alternately deforming two elastically deformable mirrors. The deformed amount may be monitored with high precision, and the reference wave-front generating unit is provided to produce a reference wave front to measure an aspheric surface shape.

The present invention uses the reference wave-front generating unit provided at the object-light side to produce an aspheric wave front so as to reduce an offset amount from the aspheric surface shape as a surface to be measured, and uses the elastically deformable mirror at the reference-light side to produce an aspheric wave front at the reference-light side and reduce the final offset amount, whereby interference fringes are generated over the entire area for measurement.

Where a measured aspheric surface is represented means of $K_1$, $A_1$, $B_1$, $C_1$, $D_1$, and $c_1$, and an aspheric surface generated at the reference wave-front generating unit is represented by means of $K_2$, $A_2$, $B_2$, $C_2$, $D_2$, and $c_2$, an offset amount $\delta_1$ between the aspheric wave front generated by the reference wave-front generating unit and the target aspheric surface is represented by the following equation:

$$\delta_1 = \frac{1}{2}(c_1 - c_2)r^2 + \left\{\frac{1}{8}\{c_1^3(1+K_1) - c_2^3(1+K_2)\} + (A_1 - A_2)r^4 + \right. \quad (3)$$
$$\left\{\frac{1}{16}\{c_1^5(1+K_1)^2 - c_2^5(1+K_2)^2\} + (B_1 - B_2)\right\}r^6 +$$
$$\left\{\frac{5}{128}c_1^7(1+K_1)^3 - c_2^7(1+K_2)^3\} + (C_1 - C_2)\right\}r^8 +$$
$$\left\{\frac{7}{256}\{c_1^9(1+K_1)^4 - c_2^9(1+K_2)^4\} + (D_1 - D_2)\right\}r^{10}$$

Moreover, the elastically deformable mirror at the reference-light side also produces an aspheric wave front. Where an aspheric surface at the reference-light side is represented by means of $K_3$, $A_3$, $B_3$, $C_3$, $D_3$, and $c_3$, an offset amount $\delta_2$ of the final wave front is represented below after the reference-light and object-light wave fronts are synthesized. Since $\delta_2$ is smaller than $\delta_1$, the interference fringes may be produced over the entire surface whereby the measurement using interference may be realized.

$$\delta_2 = \frac{1}{2}(c_1 - c_2 - c_3)r^2 + \quad (4)$$
$$\left\{\frac{1}{8}\{c_1^3(1+K_1) - c_2^3(1+K_2) - c_3(1+K_3)\} + (A_1 - A_2 - A_3)r^4 + \right.$$
$$\left\{\frac{1}{16}\{c_1^5(1+K_1)^2 - c_2^5(1+K_2)^2 - c_3(1+K_3)^2\} + \right.$$
$$(B_1 - B_2 - B_3)\}r^6 +$$
$$\left\{\frac{5}{128}c_1^7(1+K_1)^3 - c_2^7(1+K_2)^3 - c_3^7(1+K_3)^3\} + \right.$$
$$(C_1 - C_2 - C_3)\}r^8 +$$
$$\left\{\frac{7}{256}\{c_1^9(1+K_1)^4 - c_2^9(1+K_2)^4 - c_3^9(1+K_3)^4\} + \right.$$
$$(D_1 - D_2 - D_3)\}r^{10}$$

Some embodiments of the present invention use one or two elastically deformable mirrors at the reference-light side and the reference wave-front generating unit at the object-light side to synthesize wave fronts from them. As a result, various aspheric wave fronts may be easily produced. Advantageously, it is possible to measure various aspheric surfaces with this extremely general-purpose apparatus itself as a reference. In addition, this flexible interference measurement method may provide the same accuracy as the spherical-surface measurement, and easily measure aspheric surfaces, which have been difficult to be measured with high precision.

A description will now be given of each embodiment according to the present invention, with reference to the accompanying drawings.

FIG. 1 is a schematic view of essential parts of a first embodiment according to the present invention, and denotes a shape measuring method of an aspheric surface as a surface to be measured or a target surface. The first embodiment provides an elastically deformable mirror 21 at the reference-light side and a reference wave-front generating unit 3 at the object-light side, and measures the aspheric surface shape of a target surface 5 using the aspheric wave fronts from them. In particular, the elastically deformable mirror 21 at the reference-light side produces high order (e.g., six power and higher of a moving radius R of a wave front) of an aspheric surface, and produces spherical aberration from the reference wave-front generating unit 3 at the object-light side so as to produce a reference wave front of fourth power or higher of a moving radius R of a wave front. Incidentally, an order of a moving radius R of a wave front may be arbitrarily generated.

An interferometer shown in FIG. 1 has a structure known as a Twyman-Green interferometer. In FIG. 1, light La, which has been emitted from a laser light source (not shown) and collimated (or made parallel), known laser, such as HeNe, Ar, HeCd, and a harmonic component of YAG.

A beam splitter 11 initially divides a wave front of the collimated light into two, and the optical path is accordingly divided into a reference optical path through which reference light goes to the elastically deformable mirror 21 forming a reference plane, and an optical path through which light goes to an object (or surface to be measured) 5.

Then, the beam splitter 11 synthesizes the reference light and object light, and lens 61 forms interference information on an image-pickup means (or observation plane) 7, such as a CCD. As a result, a surface shape of the target surface 5 may be measured.

The light that has gone to the reference optical path passes through a beam splitter 12 and reflects at the elastically deformable mirror (or reference mirror) 21, and returns to the beam splitter 11. As the high measurement accuracy essentially requires a phase measurement, an approach called a Phase Measuring Interferometer ("PMI") is applied. For example, FIG. 1 shows an exemplary structure that minutely drives the reference mirror 21 in a direction of optical axis in wavelength order.

The elastically deformable mirror 21 changes its mirror shape (or a reflective surface shape) and produces, as shown in FIG. 2, a desired aspheric wave front by using a drive member 21b, such as an actuator and a piezoelectric element, to control a thin glass plate 21a.

It is necessary to monitor the deformed amount with high accuracy so as to use this elastically deformable mirror 21. The piezoelectric element and actuator are insufficient in measurement accuracy, and thus this system 1 has another interferometer (deformed-amount monitoring interferometer) 101 at the reference-light side so as to monitor the deformed amount of the reference plane, as shown in FIG. 1. A wavelength different from the wavelength for measuring an aspheric surface is required to monitor the deformed amount of the elastically deformable mirror 21 at the reference plane while an aspheric surface shape of the target surface 5 is measured.

A measurement of an aspheric surface shape requires higher accuracy, when measurement accuracies between the aspheric surface shape and elastically deformed amount are compared. In general, a shorter wavelength may provide a more accurate measurement, and thus a light source 1 uses a laser beam source having a wavelength shorter than that of a light source 2 in the deformed-amount monitoring interferometer 101 in FIG. 1. The different wavelengths for measuring the aspheric surface and for monitoring the deformed amount would realize real-time measurements. This is advantageous in continuously detecting an unstable component in the piezoelectric element and actuator for feedback-control purposes. Where it does not have to be monitored continuously, the light sources 1 and 2 may use the same wavelength.

Next follows a description of the deformed-amount monitoring interferometer 101. Light La2 from the light source 2 having a wavelength longer than that of the light source 1 is collimated and reflected at the beam splitter 13. Then, another beam splitter 12 divides its wave front into a wave front for the elastically deformable mirror 21 as a reference plane and a wave front for a plane mirror side as the datum plane 22.

The light from the elastically deformable mirror 21 returns to the beam splitter 12 and then is reflected, while the light reflected from the plane mirror as the datum plane 22 transmits through the beam splitter 12. These two wave fronts interfere, and the surface deformed-amount monitor 103 monitors the elastically deformed amount of the reference plane 21 through the lens 62 and CCD 72. The beam splitter 12, as used herein, is such a type (or a dichroic mirror) that divides into two wave fronts of light from the light source 2 used to monitor the elastically deformed amount of the reference plane 21, and allows the wavelength of the light La from the light source 1 used to measure the aspheric surface to transmit through it.

The plane mirror 22 having an identified surface shape as a datum plane is used for plane calibration for the elastically deformed mirror 22 so that the datum plane (plane mirror) 22 and the elastically deformable mirror 21 are accorded with each other, while the above deformed-amount monitoring interferometer 101 monitors the deformed amount at the reference light side. After the calibration, the piezoelectric element or actuator changes the surface shape of the elastically deformable mirror, thereby forming a desired aspheric wave front.

In the object optical path shown in FIG. 1, the beam splitter 11 divides a wave front, and the light at the object optical path goes to the reference wave-front generating unit 3. The reference wave-front generating unit 3 may use various structures, but the structure shown in FIG. 1, in principle, generates a wave front corresponding to the fourth power of a moving radius R of the wave front by generating spherical aberration through an adjustment of a position in an optical axis of an optical system in the reference wave-front generating unit 3.

A description will now be given of a method of generating a spherical aberration. In FIG. 1, 32 denotes a first lens, and 33 denotes a second lens. In the structure shown in FIG. 1, the lens 32 forms an image at a point A using collimated light from beam splitter 11. Since it is sufficient for the lens 32 to correct aberration in a very small range near the axis, the aberration amount may be maintained small.

Even when a minute amount of aberration remains for the lens 32, an offset process may easily cancel out the minute amount. The following description assumes that aberration is negligible for the lens 32.

The lens 33 is a lens whose aberration has been properly corrected in view of the infinite object point. For example, it may use an objective lens in a microscope, etc., and its aberration has been properly corrected with respect to a positional relationship with an object image. An image formed by the lens 33 includes much aberration in the positional setup deviated from a predetermined arrangement. Since interferometers use only on-axial optical arrangement, aberration generated due to a shift from the predetermined relationship is of rotational symmetry around the optical axis, that is, the spherical aberration.

When the image forming point A formed by the lens 32 accords with an object point for which the aberration of the lens 33 should be corrected, the aberration would be corrected well at the image forming position, which is formed after passing through the lens 33. A point B in FIG. 1 is a position where aberration of subsequent collimator (or collimator lens) 4 is best corrected.

When the point B accords with lens 33's image forming position, all the optical elements in the structure shown in FIG. 1 are arranged in a state where aberration is the least. In this way, where aberrations of the lenses 32, 33 and collimator 4 are best corrected, an arrangement of the interferometer shown in FIG. 1 is defined as a "reference state".

A detailed description will now be given of the reference state: The light, by which the lens 33 forms an image at the point B, enters the collimator 4, and then goes to the target object 5 while converted from a divergent wave to a convergent wave by the collimator 4. The collimator 4 is an optical system whose aberration has been corrected with respect to the point B. Thus, the convergent wave has a wave front that has little or no aberration, and goes to the target object 5. In the reference state, the target surface is arranged suitable for a spherical measurement. An offset of aberration in the measurement optical system from the lens 32 to the collimator 4 may be calculated when a previously identified reference spherical surface is arranged as the target object in the reference state. Again, the reference state makes an arrangement of the target surface suitable for a spherical measurement, and serves to obtain an offset of the measurement system. An offset may be obtained as proposed by "Optical Shop Testing" (edited by Malacara), etc., and a detailed description thereof will be omitted.

A description will now be given of a measurement of an aspheric surface as a surface to be measured. The instant inventor has discovered through an analysis of aspheric surfaces as a measurement object that it is efficient for an aspheric shape in a rotational-symmetry type optical system to approximate in order from a low order starting with fourth power, sixth power, eighth power, tenth power, . . . of the moving radius R of the wave front. Therefore, it is one of the features of the instant embodiment to synthesize the moving radius R of the wave front in order from a low order starting with fourth power, sixth power, eighth power, tenth power, . . . in producing a reference wave front until it comes to be in a measurable range.

The first embodiment shown in FIG. 1 structurally allows the reference wave-front generating unit 3 to intentionally generate spherical aberration at the object-light side and mainly produces a term of the fourth power of the moving radius R of the aspheric surface (more precisely a term of higher order than fourth power of the moving radius R in addition to the term of the fourth power of the moving radius R). In addition, the first embodiment uses the elastically deformable mirror 21 at the reference-light side to generate a high order of the sixth power or higher of the moving radius R, so that various aspheric wave fronts may be produced using both wave fronts.

The spherical aberration is generated by the reference wave-front generating unit 3 at the object-light side in accordance with the following procedure: The lens 33's aberration at the point B is corrected only when the image forming point A for the lens 32 is located at a predetermined object point. Therefore, as the lens 32 is moved in an optical-axis direction and a position of the point A is shifted from a position for eliminating the lens 33's aberration, an image forming position is offset from the point B, generating the spherical aberration.

FIG. 3 shows this transition. FIG. 3A shows a lens arrangement for sufficiently correcting the lens 33's aberration, in which an image forming position A formed by the lens 32 forms an image at a point 33p in which the lens 33's aberration is eliminated, and the lens 33 forms an image at a point 33q. In the reference state, the point 33q accords with the object point position B where collimator 4's aberration is corrected. The image forming position A is then moved, as shown in FIG. 3B, to a point 33p1 by moving the lens 32 to the right in the optical-axis direction and, as a result, the image forming position of the point 33p1 by the lens 33 moves to the point 33q1. The spherical aberration occurs since the points 33p1 and 33q1 are not in an aberration-corrected relationship. The instant embodiment uses this spherical aberration as a reference wave front (or surface to be measured). When the lenses 32 and 33 are moved as one member to the light in the optical-axis direction with respect to the collimator 4, lens 33's image forming position accords with the point B while maintaining the generated spherical aberration. Here, the movement as one member results from a parallel beam incident onto the lens 32.

The spherical-aberration generating amount and its sign (i.e., plus or minus) from the reference wave-front generating unit 3 is controllable using a moving amount and moving direction of the lens 32. Therefore, a term corresponding to the fourth power of the moving radius R may be regarded as a variable amount. One of the objects in this embodiment is such highly precise measurement as has accuracy in angstrom order. Strictly speaking, the aberration occurring as a result of positional adjustment between the lenses 32 and 33 does not restrictively depends upon the fourth power of the moving radius R of the wave front, but if positions of the lenses 32 and 33 in the direction of the optical axis are accurately known, the computer may use these values to accurately calculate resultantly generated aberration from low to high order terms. The calculated values, including the high order terms may be used as a value of the reference wave front.

Therefore, in producing a wave front by the elastically deformable mirror 21 at the reference-light side and a reference wave front by the reference wave-front generating unit 3 at the object-light side, an aspheric wave front is produced by changing a shape of the elastically deformable mirror 21 at the reference-light side, while spherical aberration is generated through positional adjustments of the lenses 32 and 33 at the object-light side. Thereby, various aspheric surface shapes may be measured by composing in order from the low order of the fourth power, sixth power, eighth power, tenth power, . . . , of the moving radius R until the aspheric surface shape becomes within a measurable range.

The embodiment shown in FIG. 1 uses a laser interferometer (positional information monitor) 102 for monitoring a position of lens 32's lens-barrel in order to detect a position of the lens 32. More specifically, the position monitoring laser interferometer 102 emits a beam 32-2 to a mechanical part 32-1 for moving the lens 32's lens-barrel. Instead of the laser interferometer, a position-detecting element may be used, such as a magnetic scale and an encoder, and the calculation means 104 calculates a generated aberration amount accurately using this monitor function.

The laser interferometer 102 may monitor only lens 32's relative deformation amount, and it is necessary to determine a reference position. The above "reference state" is used to determine the reference position. An optical system is placed in the reference state, and an identified reference spherical surface is placed at the target object position. In this state, positions of the lens 32, 33, collimator 4, and the reference spherical surface are adjusted so that aberration becomes closest to data of the identified reference spherical surface. Positional adjustments end among the lenses 32, 33, and lens 4 when they are in a permissible value range as a result of the adjustment. This position becomes a reference position of the position-detecting element (or the laser interferometer 102). The aberration generating amount given by a drive amount from the reference position may be accurately calculated with a precision determined by the drive amount. The precision accuracy in nano meter order is available with the laser interferometer 102, and it is accuracy enough to know the aberration.

While FIG. 1 shows a position detecting element for the lens 32, similar position detecting elements are provided for other optical elements, such as 33, 4, and 21.

Figure 9:
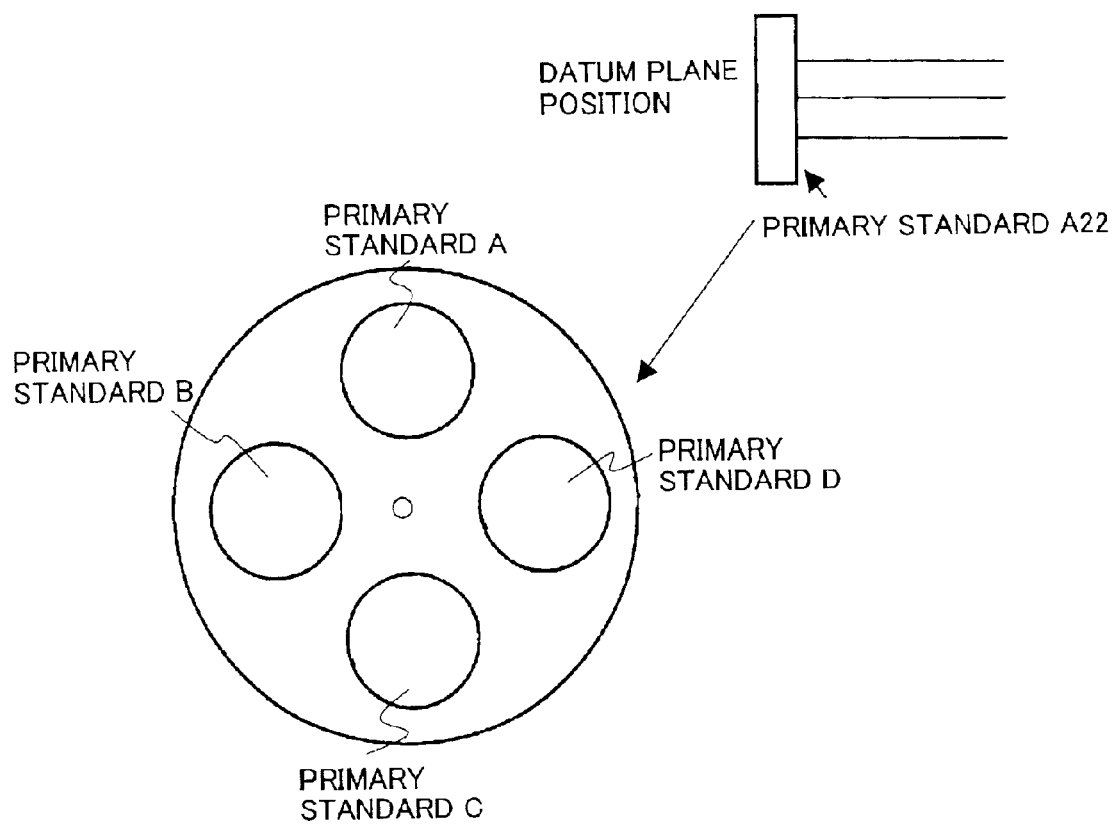
FIG. 9 is a partial variation of the structure shown in FIG. 1.

Although the plane mirror is used as a datum plane at the time of calibrating the elastically deformable mirror and monitoring the deformed amount, plural spherical or aspheric primary standards may be used whose aspheric amounts have been measured. For example, one of plural primary standards A–D may be selected, as shown in FIG. 9, whose aspheric or spherical amounts have been measured.

Although the instant embodiment produces a reference wave front by generating spherical aberration through positional adjustments of lenses 32 and 33 at the object-light side, the way of generating spherical aberration is not limited to this method and may use a method as shown in FIG. 4. A lens 133 in the reference wave-front generating unit 3 serves to generate aberration relative to collimated incident light in the instant embodiment.

FIG. 4A shows a system for controlling the yield of spherical aberration by controlling a separation between two lenses 133a and 133b in the lens 133. A change of the image forming position with a change of separation d is adjusted by moving the entire lens 131. As in the first embodiment, a reference position of the separation d utilizes a similarly calculated reference state using the lens 133, collimator 4, and reference spherical surface.

FIG. 4B shows an example, which inserts two prisms (or wedges) 134 and 135, which serve a parallel plane as a whole and may continuously change a thickness at a rear position of the lens 133. In order to make a thickness of the parallel plane variable, a combination of two, similarly angled wedges 134 and 135 is moved in a direction orthogonal to the optical axis Oa. The reference position in this case is adjusted, similar to the first embodiment, by once realizing the reference state. In case of a parallel plane shown in FIG. 5C, generated spherical aberration is calculated through use of an accurate measurement of a thickness of the plane.

FIG. 5C shows an example for controlling spherical aberration by discretely changing a plurality of parallel planes. In this case, generated spherical aberration is calculated through use of an accurate measurement of a thickness of the plane.

The instant embodiment uses the above structure to compose, at the beam splitter 11, a reference wave front through the elastically deformable mirror 21 and a target surface (signal wave front) that has returned to the original optical path after passing through the reference wave-front generating unit 3 and collimator 4 and then reflected at the target surface 5, uses the lens 61 to form an interference wave front on an image-pickup means 71, such as a CCD, and measures a surface shape (surface information) of the target surface 5 using a signal (or interference signal) from the image-pickup means 71.

Figure 5:
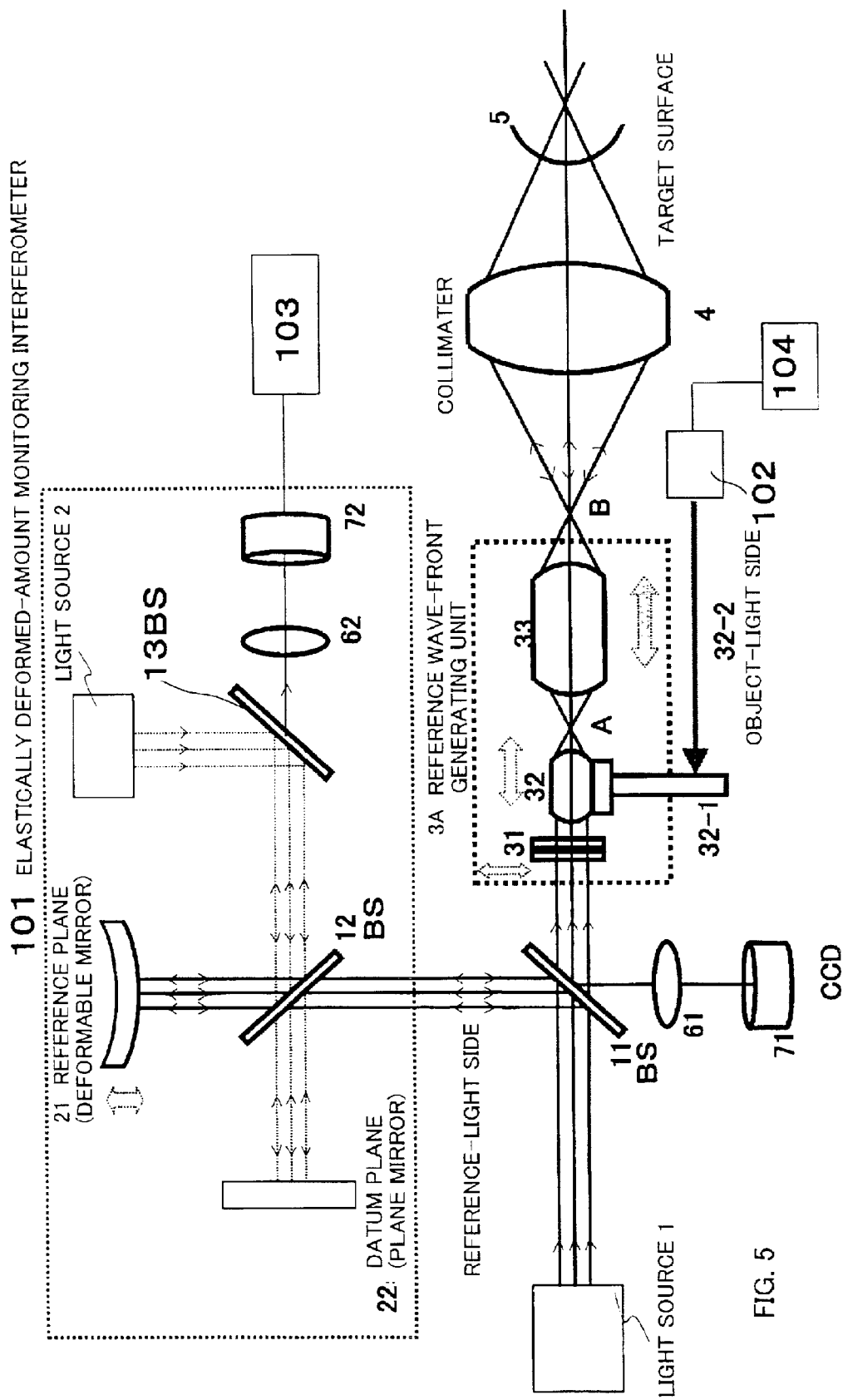
FIG. 5 is a schematic view showing essential parts in an aspheric-surface measuring interferometer of a second embodiment according to the present invention.

FIG. 5 shows a schematic view of essential parts of the second embodiment of the present invention and shows a method of measuring an aspheric surface as a target surface. The second embodiment provides the elastically deformable mirror 21 at the reference-light side, the reference wave-front generating unit 3A at the object-light side, and uses aspheric wave fronts from both members to measure the aspheric surface shape of the target surface 5. The second embodiment has the same basic structure as the first embodiment.

This embodiment is different from the first embodiment in that it uses the reference wave-front generating unit 3A instead of the reference wave-front generating unit 3 at the object-light side so as to generate spherical aberration. Thereby, wave fronts of fourth power or higher of a moving radius R, in particular, sixth power or higher of a moving radius R using an Alvarez lens are produced, while the elastically deformable mirror 21 at the reference-light side produces wave fronts of eighth power or higher of the moving radius R.

Although the first embodiment uses a positional adjustment of lens 32 in the reference wave-front generating unit 3 to generate spherical aberration primarily corresponding to aberration of a term of the fourth power of a moving radius R. However, an actual aspheric surface is not indicated only by a term of the fourth power of a moving radius R of the wave front, but requires an introduction of higher order terms. It sometimes difficult to form an aspheric reference wave front only by using the positional adjustment of the lens 32 to freely control high order of the sixth power or higher of the moving radius R.

Accordingly, the second embodiment uses an Alvarez lens 31 to generate aberration having a shape of high order that exists in an actual aspheric surface. A description will now be give of an Alvarez lens 31.

Figure 6:
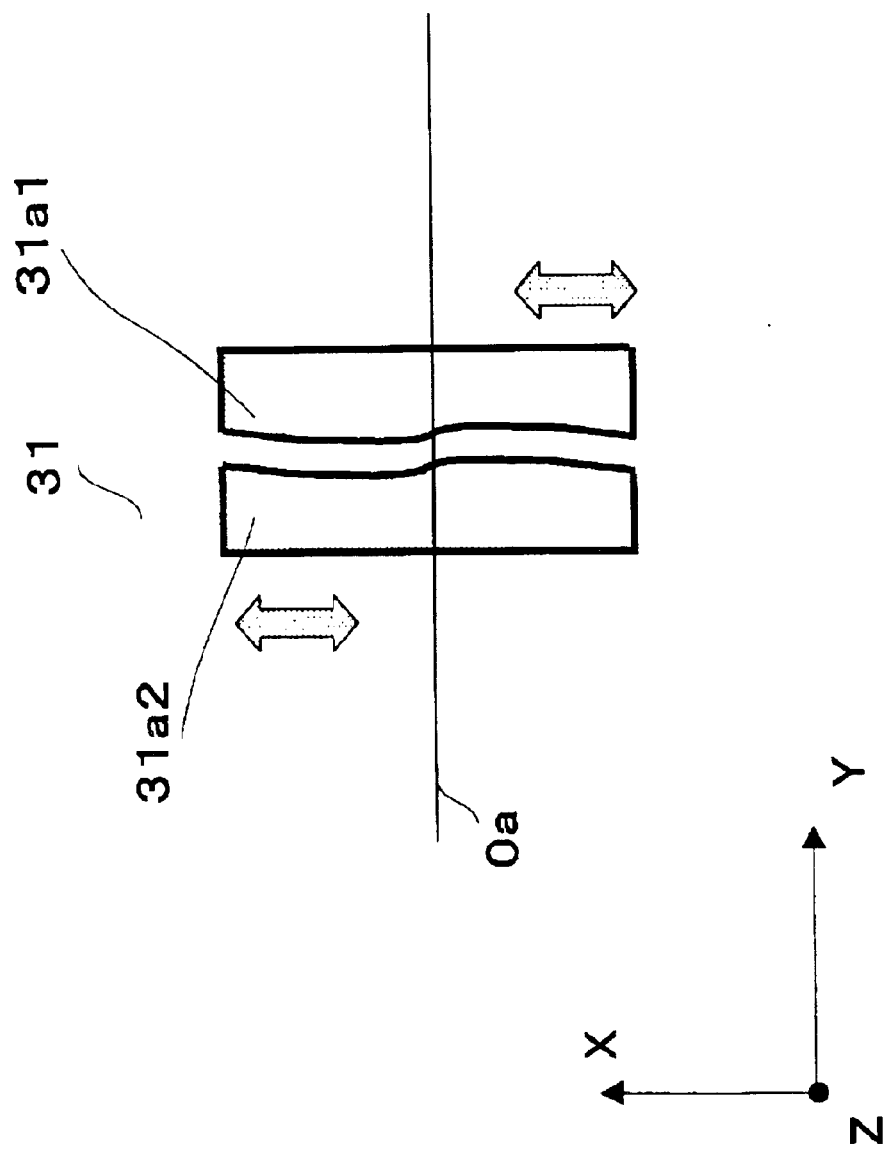
FIG. 6 is a principal view of an Alvarez lens shown in FIG. 5.

The Alvarez lens 31 includes a pair of lenses 31a1 and 31a2 having the same shape, as shown in FIG. 6, and arranges aspheric surfaces shown by f(x, y), opposite to each other. When the relative offset between two lenses 31a1 and 31a2 in the x-y plane is zero, the Alvarez lens serves as a plane plate. With a proper selection of a shape of f(x, y), the high order aberration may be freely generated by driving one of two lenses 31a1 and 31a2 by $\Delta$ in a direction y perpendicular to a direction of the optical axis Oa, and the other by $-\Delta$.

For instance, when it is assumed that a shape of the Alvarez lens f(x, y) which provides a feature of the sixth power by offsetting in the direction y is defined as $f(x, y) = a(x^6 y + y^7/7)$, a transparent wave front $W(x, y)$ of an Alvarez lens which is offset in the direction y by $\pm\Delta$ is defined as $W(x,y) \approx 2a\Delta(n-1)(x^6+y^6)$, where n is a refractive index of a glass material, thereby forming a wave front proportional to the offset amount $\Delta$. As discussed, when the offset amount $\Delta$ is formed symmetrically with respect to plus and minus, terms of even orders disappear and nonlinear effect of the offset amount $\Delta$ may be avoided. Control over the offset amount $\Delta$ would adjust the generated aberration amount.

It is difficult to ideally manufacture an aspheric shape f(x, y) that characterizes the Alvarez lens 31, and thus manufacturing errors need to be calibrated. In calibration, the offset amount is calculated through a measurement with a reference state and an identified datum plane, as in the spherical aberration. An offset amount including an error of f(x, y) and a nonlinear effect generated from the offset amount $\Delta$, etc. is corrected. A position of the Alvarez lens is detected by attaching a position-detecting element to each Alvarez lens.

Although a description have been given of a term of the sixth power of a moving radius R of a wave front, terms of the eighth power and tenth power would be controllable by an insertion of plural Alvarez lenses. The number of Alvarez lenses to be inserted differs according to a shape of a target aspheric surface. In FIG. 5, 31 corresponds to an Alvarez lens for generating a term of the sixth power.

The second embodiment thus provides the elastically deformable mirror 21 at the reference-light side, and the reference wave-front generating unit 3A at the object-light side, and uses aspheric wave fronts from both members to measure the aspheric surface shape of the target surface 5. In particular, the reference wave-front generating unit 3A at the object-light side generates spherical aberration, and the fourth power (and higher orders accurately speaking) of the moving radius R. The Alvarez lens 31 produces a wave front of the sixth power of the moving radius R. The elastically deformable mirror 21 produces wave fronts of high order (of eighth power and higher of the moving radius R). As a result, various aspheric surfaces may be measured.

Figure 7:
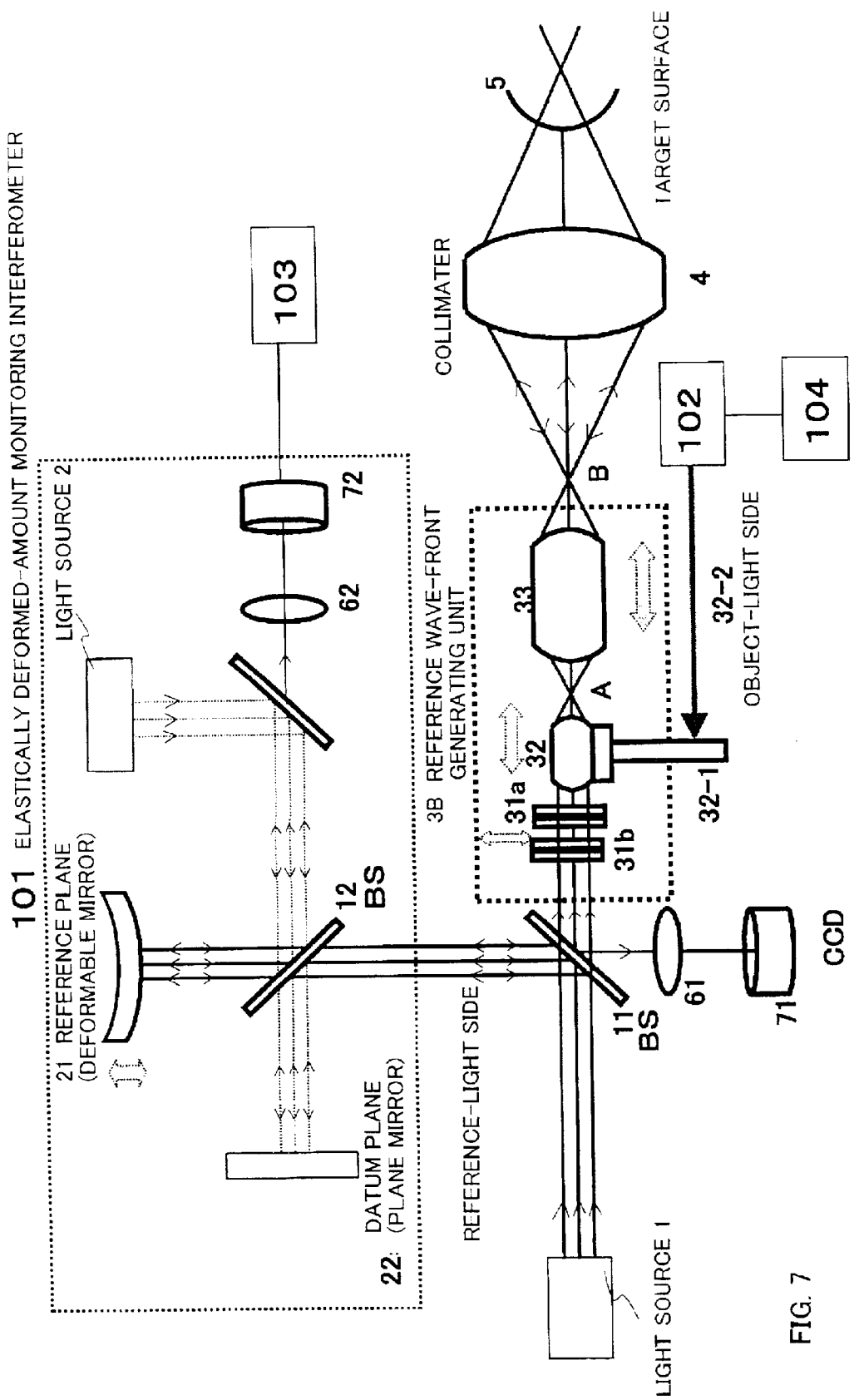
FIG. 7 is a schematic view showing essential parts in an aspheric-surface measuring interferometer of a third embodiment according to the present invention.

FIG. 7 shows a schematic view of essential parts of the third embodiment of the present invention. This embodiment has the same basic structure as that of the first and second embodiments. The third embodiment provides the elastically deformable mirror 21 at the reference-light side, and the reference wave-front generating unit 3B at the object-light side, and uses aspheric wave fronts from both members to measure the aspheric surface shape of the target surface 5. In particular, the third embodiment characteristically uses two Alvarez lenses 31a and 31b at the object-light side.

This embodiment uses the reference wave-front generating unit 3B, instead of the reference wave-front generating unit 3, to generate spherical aberration and control the yield of spherical aberration in proportion to the fourth power and higher of the moving radius R. In addition, the Alvarez lens 31a produces the wave fronts corresponding to the sixth power of the moving radius, while another Alvarez lens 31b produces the wave front in proportion to the eighth power of the moving radius R. The elastically deformable mirror 21 at the reference-light side produces wave fronts of high order of tenth power and higher. Thereby, various aspheric surfaces may be measured. Similar to the first embodiment, offsets for the reference positions of the Alvarez lenses 31a and 31b may be calculated by realizing a similar reference state using the lenses 32, 33, collimator 4, and the reference spherical surface and then by inserting Alvarez lenses. Similar to the second embodiment, the number of Alvarez lenses to be inserted differs according to the target aspheric surface shape.

Figure 8:
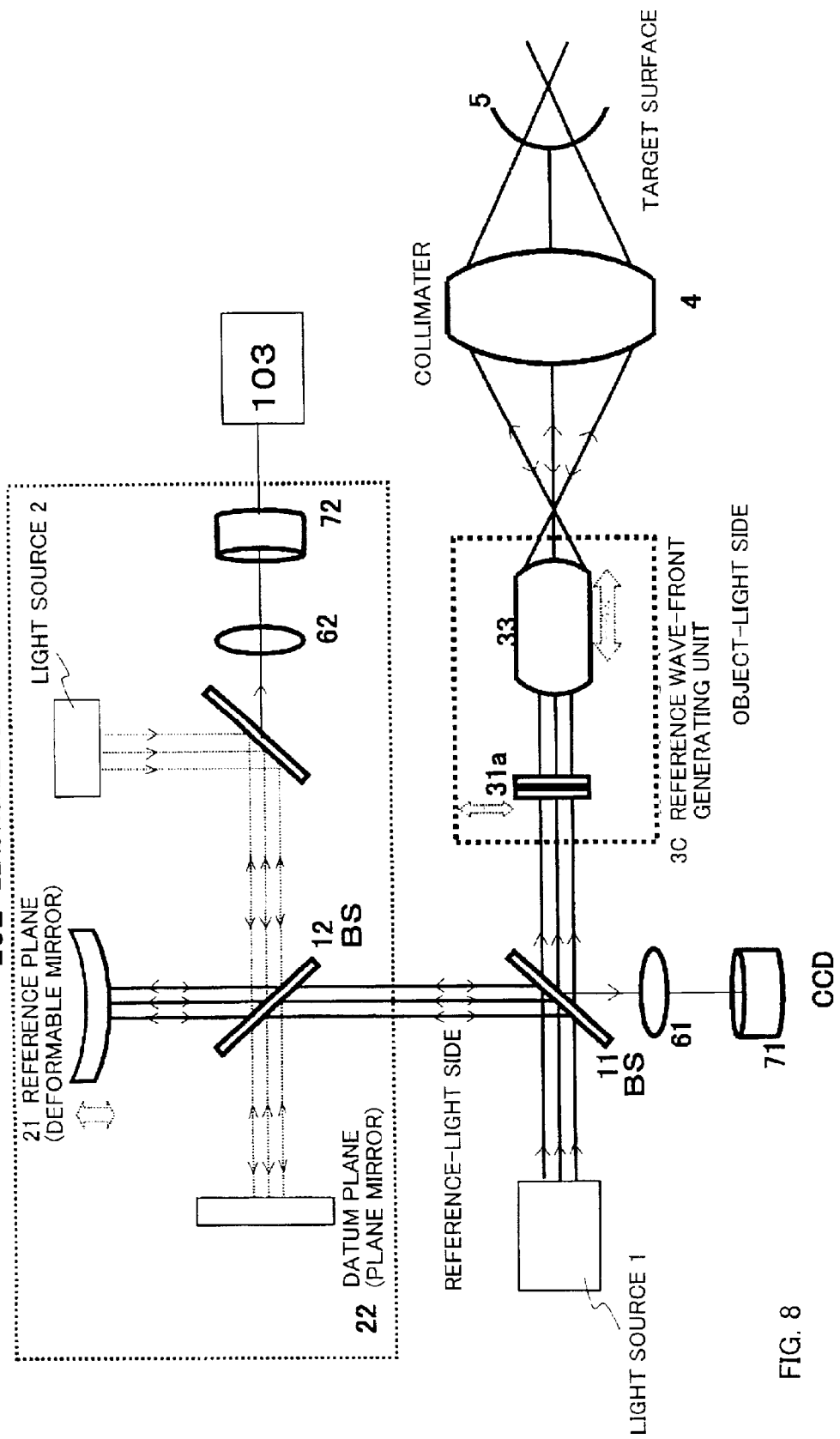
FIG. 8 is a schematic view showing essential parts in an aspheric-surface measuring interferometer of a fourth embodiment according to the present invention.

FIG. 8 shows essential parts of the fourth embodiment of the present invention. This embodiment has the same basic structure as that of the first and second embodiments. The fourth embodiment provides the elastically deformable mirror 21 at the reference-light side, and the reference wave-front generating unit 3C at the object-light side, and uses aspheric wave fronts from both members to measure the aspheric surface shape of the target surface 5. This embodiment makes the Alvarez lens 31a at the object-light side generate aberration of the fourth power of the moving radius R.

This embodiment uses the reference wave-front generating unit 3C, instead of the reference wave-front generating unit 3, and the lens 33 serves to form an image using a collimated beam without aberration. As illustrated, the Alvarez lens 31a controls the yield of spherical aberration in proportion to the fourth power of the moving radius R. Similar to the first embodiment, an offset for the reference position of the Alvarez lens may be calculated by realizing a similar reference state using the lenses 32, 33, collimator 4, and the reference spherical surface and then by inserting Alvarez lens 31a.

The elastically deformable mirror 21 located at the reference-light side is used to generate aberration in proportion to a term of high orders of sixth power and higher of the moving radius R that is not generated at the Alvarez lens 31a at the object-light side. Similar to the second and third embodiments, the number of Alvarez lenses to be inserted differs according to the target aspheric surface shape.

Figure 10:
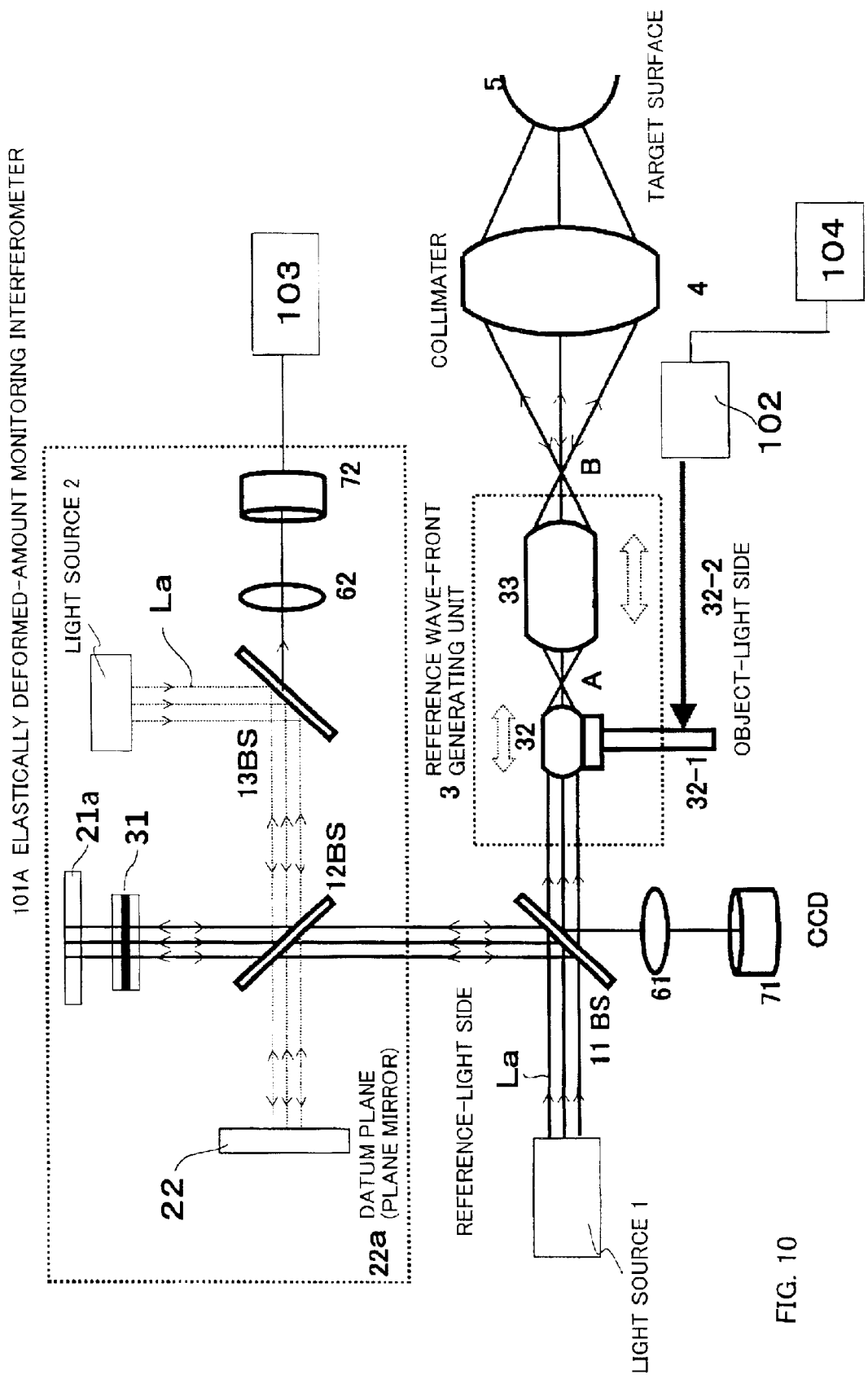
FIG. 10 is a schematic view showing essential parts in an aspheric-surface measuring interferometer of a fifth embodiment according to the present invention.

FIG. 10 shows essential parts of the fifth embodiment of the present invention. This embodiment is different from the first embodiment in having an elastically deformed-amount monitoring interferometer 101A including an Alvarez lens 31 and a plane mirror 21a instead of the elastically deformable mirror as the reference wave-front deforming system for deforming a reference-light wave front. Other than that, this embodiment has the same structure as that of the first embodiment. This embodiment may have plural Alvarez lenses 31, the number of Alvarez lenses corresponding to the order of the moving radius of a wave front.

Instead of the Alvarez lens 31, the instant embodiment may use CGH to generate predetermined order of the moving radius of a wave front. A plurality of CGHs may be made replaceable or switchable in accordance with a desired wave front.

FIG. 11 is a schematic view of essential parts of a sixth embodiment according to the present invention, and shows a measurement method of a shape of an aspheric surface as a target surface. This embodiment is different from the first embodiment in that this embodiment uses an elastically deformed-amount monitoring interferometer 101B, instead of the elastically deformed-amount monitoring interferometer 101. Other than that, the instant embodiment is the same as the first embodiment.

The instant embodiment provides two elastically deformable mirrors 221 and 223 at the reference-light side, and the reference wave-front generating unit 3 at the object-light side, and uses aspheric wave fronts from both members to measure aspheric surface shape of the target surface 5. In particular, the elastically deformable mirrors 221 and 223 at the reference-light side produce high order (e.g., six power and higher of a moving radius R of a wave front) of an aspheric surface, and produces spherical aberration from the reference wave-front generating unit 3 at the object-light side so as to produce a reference wave front of fourth power or higher of a moving radius R of a wave front.

The instant embodiment has such a feature that a primary standard 222 as a reference and two elastically deformable mirrors 221 and 223 are provided along the reference optical path, and alternate adjustments and deformations of the elastically deformable mirrors 221 and 223 produce a desired wave front. These elastically deformable mirrors 221 and 223 have the same structure as the elastically deformable mirror 21 shown in FIG. 2.

Figure 12:
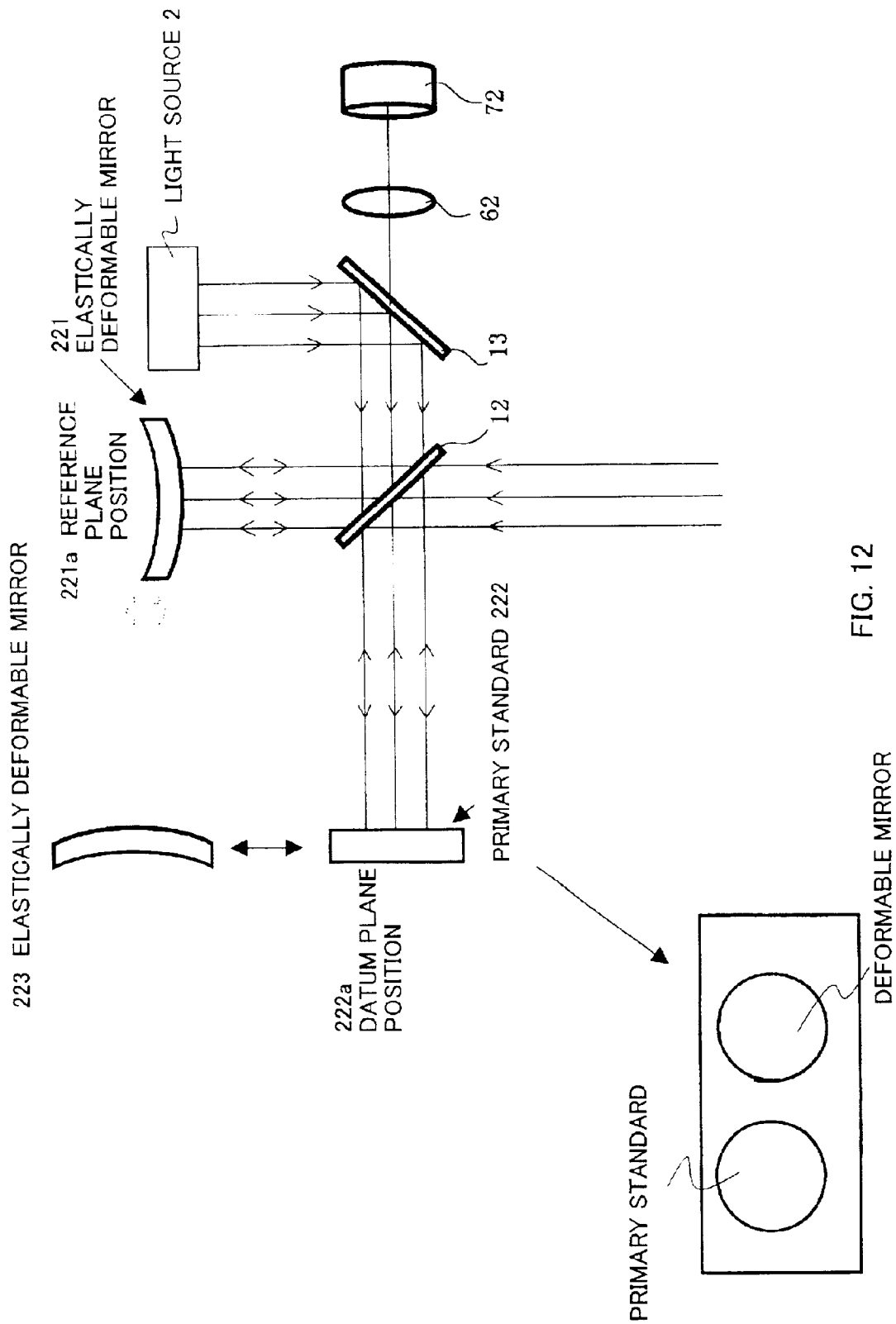
FIG. 12 is a view for explaining an elastically deformed-amount monitoring interferometer shown in FIG.

It is necessary to monitor the deformed amount with high accuracy so as to controllably deform the elastically deformable mirrors 221 as a reference plane into a desired shape. The piezoelectric element and actuator are often insufficient in measurement accuracy, and thus this system has another interferometer (deformed-amount monitoring interferometer) 101B at the reference-light side so as to monitor the deformed amount of the reference plane, as shown in FIG. 11. This embodiment uses interference between a beam from the elastically deformable mirror 221 and a beam from the primary standard 222 or the elastically deformable mirror 223, to control the surface shape of the elastically deformable mirror 221. FIG. 12 is a view for explaining the elastically deformed-amount monitoring interferometer 101B. As shown in FIG. 12, the plane mirror 222 and the elastically deformable mirror 223 may be replaced with each other at the datum plane position.

A wavelength different from the wavelength for measuring an aspheric surface is required to monitor the deformed amount of the elastically deformable mirror 221 at the reference plane while an aspheric surface shape of the target surface 5 is measured.

Next follows a description of the deformed-amount monitoring interferometer 101B. Light La2 from the laser beam source 2 is collimated and reflected at the beam splitter 13. Then, another beam splitter 12 divides its wave front into a wave front for the elastically deformable mirror 221 at the reference plane position and a wave front for the datum plane position 222. The light from the elastically deformable mirror 221 returns to the beam splitter 12 and then is reflected, while the light reflected from the plane mirror as the datum plane position 222 transmits through the beam splitter 12. These two wave fronts interfere and the surface deformed-amount monitor 103 monitors the elastically deformed amount of the reference plane 221 through the beam splitter 13, the lens 62 and CCD 72. The beam splitter 12, as used herein, is a type that divides into two wave fronts of a beam from the light source 2 used to monitor the elastically deformed amount, and allows the wavelength of the light La from the light source 1 used to measure the aspheric surface to transmit through it.

Next follows a description of a procedure for changing the elastically deformable mirror 221 as a reference plane into a desired surface shape, with reference to FIG. 13.

Initially, the elastically deformable mirror 221 is located at the reference plane position 221a, while the primary standard 222 having an identified shape is located at the datum plane position 222a. Although the plane mirror is used as one example of the primary standard 222, an aspheric or spherical surface may be used as a primary standard having an identified shape. An interferometer (or elastically deformed-amount monitoring interferometer 11B) that may monitor both shapes is used to calibrate the elastically deformed mirror 221 so that shapes between the elastically deformable mirror 221 at the reference plane and the primary standard 222 may be accorded.

After the calibration of a surface shape of the elastically deformable mirror 221, the primary standard 222 is replaced with the elastically deformable mirror 223 at the datum plane position 222a, and the interferometer recognizes shapes of two elastically deformable mirrors 221 and 223. A surface shape of the elastically deformable mirror 223 at the datum plane position 222a is controlled so as to accord it with the surface shape of the elastically deformable mirror 221 at the reference plane position that has been calibrated with the primary standard 222. As a result, both surface shapes of the elastically deformable mirrors 221 and 223 accord with the primary standard 222.

Next, a surface shape is deformed through control over the actuator so that the elastically deformable mirror 221 at the reference plane position 221a approaches to a desired aspheric wave front. The interference between the reference plane and datum plane (or the elastically deformed-amount monitoring interferometer 101B) may monitor this deformed amount, and the controllable deformed amount may be within a measurable range for the interferometer between the reference plane and datum plane. Moreover, the elastically deformable mirror 223 at the datum plane position 222a is controlled so that it has the same surface shape as that of the elastically deformable mirror 221 at the reference plane position 221a.

Similarly, the surface shape of the elastically deformable mirror 221 at the reference plane position 221a is controlled so that it approaches to the desired aspheric wave front, and thereafter the elastically deformable mirror 223 at the datum plane position 222a is repetitively and alternately controlled so that it has the same surface shape as that of the elastically deformable mirror 221. This alternate deformation continues until the surface shape of the elastically deformable mirror 221 located at the reference plane position 221a finally becomes the desired aspheric wave front.

Because of the alternate deformations of surface shapes of two elastically deformable mirrors 221 and 223, a deformation with high precision is available using the interferometer even when there is a wave front having a large offset from a spherical surface, whereby a desired wave front may be produced finally. A deformation approach of two elastically deformable mirrors 221 and 223 is not limited to that shown in FIG. 13, and each deformed amount and the number of repetitions when both members are alternately deformed differ according to aspheric surface shapes.

Figure 14:
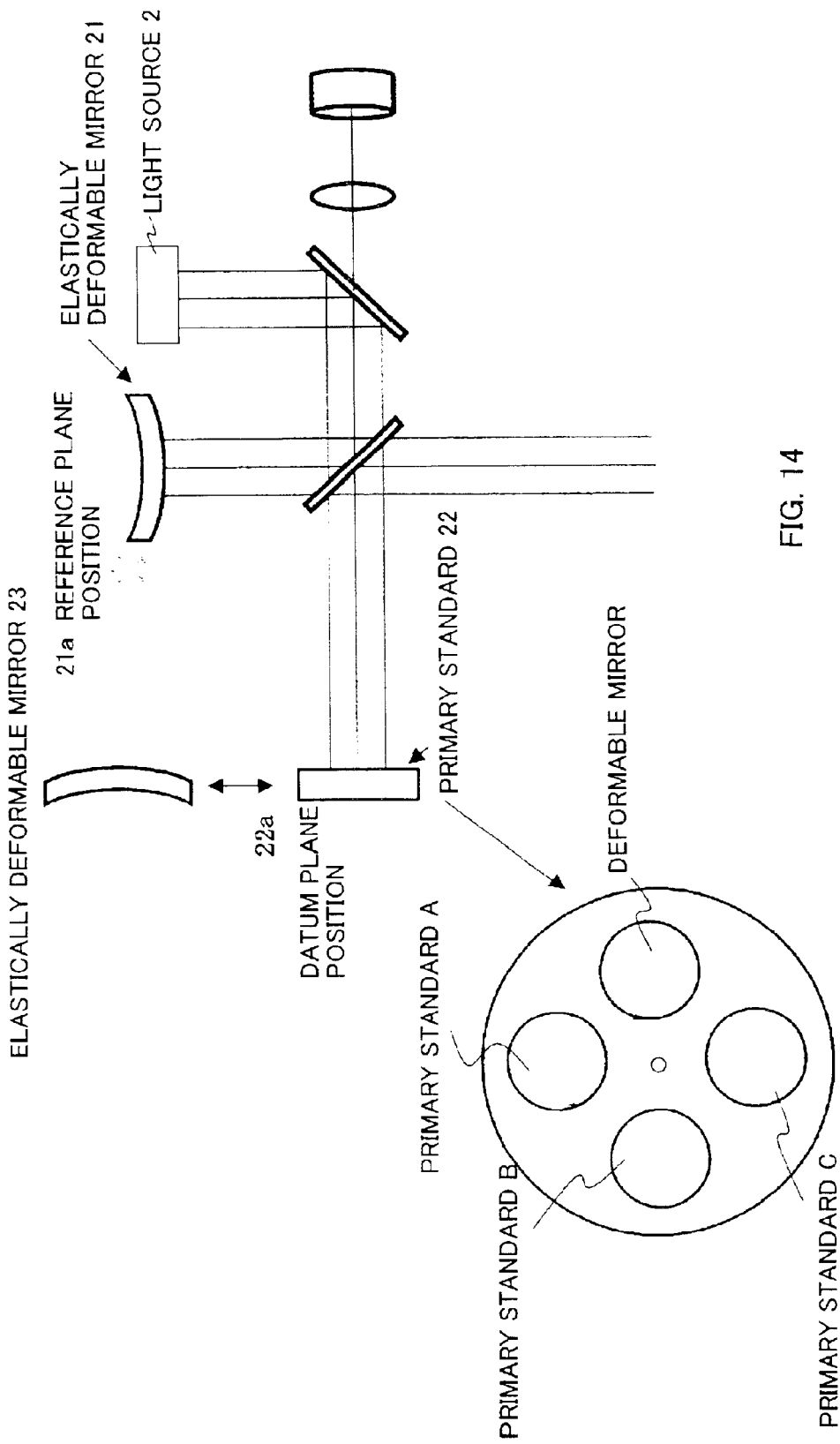
FIG. 14 is a view for explaining a selection of one of plural primary standards at a basic plane position.

Although the instant embodiment uses a plane mirror as the primary standard 222, it takes time to create a desired aspheric wave front from a plane due to much deformed amount. This primary standard is not limited to the plane mirror, but may use any shape, such as a spherical mirror and an aspheric mirror, as far as it has an identified shape. Accordingly, as shown in FIG. 14, such a system may be create that may select one elastically deformable mirror 223 and plural primary standards for the datum plane position 222a, so as to select one primary standard in accordance with a desired wave front. For example, a plurality of spherical primary standards may be prepared, and a primary standard may be selected which corresponds to a curvature radius of a spherical surface to be measured, so that a desired aspheric wave front may be produced based on the spherical surface.

At the time of the initial calibration, this system accords surface shapes of the elastically deformable mirrors 221 and 223 with the primary standard 222. Therefore, this system reduces the deformed amount that is required to deform into a desired shape by using a primary standard having the closest primary standard, and decreases the number of alternate controls between two elastically deformable mirrors, thereby easily forming a desired reference wave front. Thus, an interference using two elastically deformable mirrors and the primary standard determines a surface shape of the elastically deformable mirror 221 located at the reference plane position and freely produces a desired reference wave front.

The reference-light side uses two elastically deformable mirrors 221 and 223 and primary standard to change a surface shape of the elastically deformable mirror 221 to a desired shape and to produce an aspheric wave front. On the other hand, the object-light side produces spherical aberration through positional adjustments of lenses 32 and 33, and synthesizes wave fronts in order from a low order starting with fourth power, sixth power, eighth power, tenth power, ..., of the moving radius R until the aspheric surface shape comes to be in a measurable range, thereby producing a desired aspheric wave front. Various aspheric surface shapes may be measured through an adjustment between the wave fronts at the reference-light side and at the object-light side.

Figure 15:
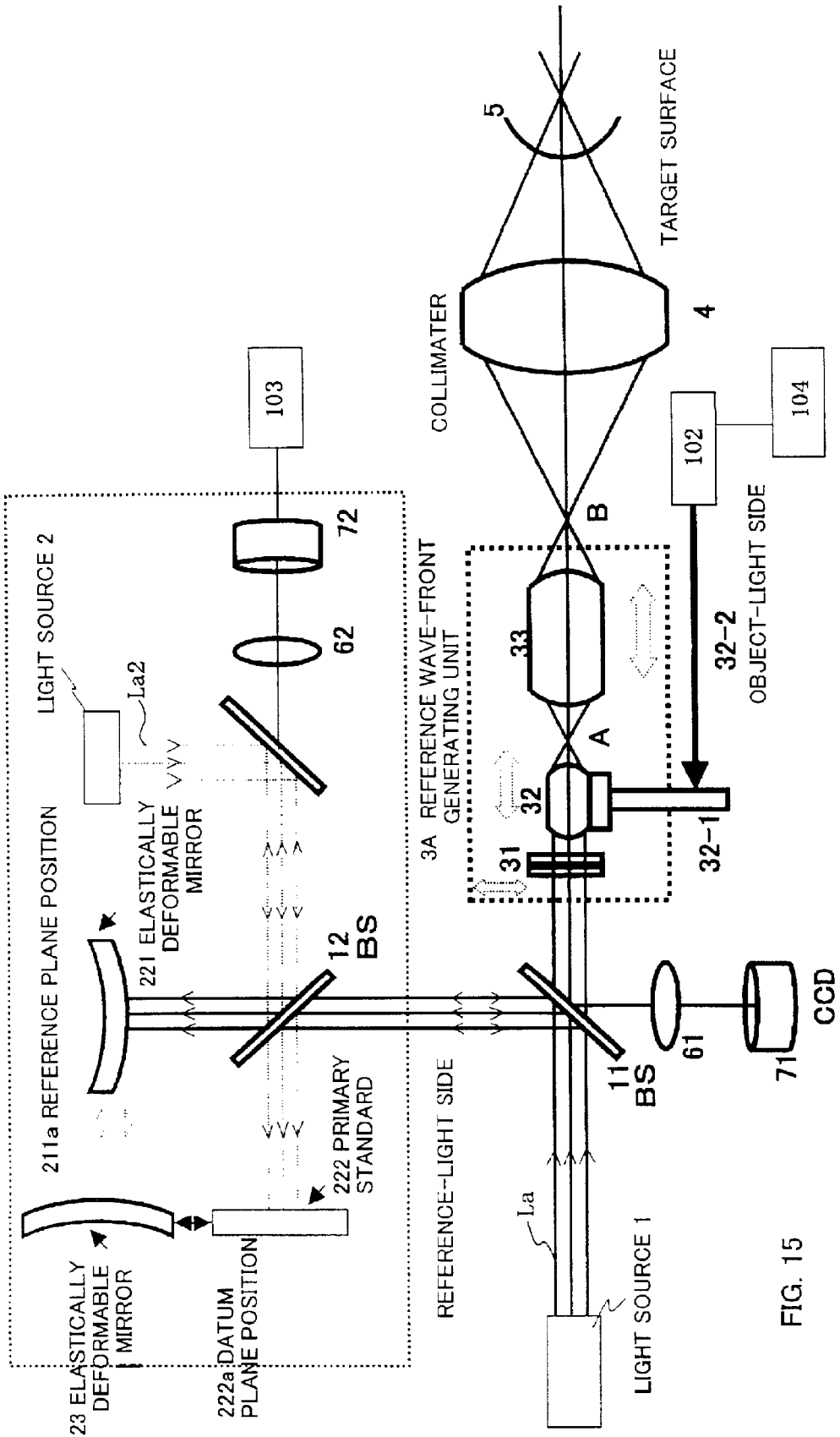
FIG. 15 is a schematic view showing essential parts in an aspheric-surface measuring interferometer of a seventh embodiment according to the present invention.

FIG. 15 shows schematic views of essential parts of the seventh embodiment of the present invention and shows a method of measuring an aspheric surface. The seventh embodiment provides two elastically deformable mirrors 221 and 223 at the reference-light side and the primary standard 222, and the reference wave-front generating unit 3A at the object-light side, and uses aspheric wave fronts from both members to measure the aspheric surface shape of the target surface 5. This embodiment has the same basic structure as the sixth embodiment.

This embodiment is different from the sixth embodiment in that it uses the reference wave-front generating unit 3A instead of the reference wave-front generating unit 3 at the object-light side so as to generate spherical aberration. Thereby, wave fronts of fourth power and higher of a moving radius R, in particular, sixth power and higher of a moving radius R using an Alvarez lens are produced, while the elastically deformable mirror 221 at the reference-light side produces wave fronts of eighth power and higher of the moving radius R.

Although the seventh embodiment uses a positional adjustment of lens in the reference wave-front generating unit 3 to generate spherical aberration primarily corresponding to aberration of a term of the fourth power of a moving radius R. However, an actual aspheric surface is not indicated only by a term of the fourth power of a moving radius R of the wave front, but requires an introduction of higher order terms. It sometimes difficult to form an aspheric reference wave front only by using the positional adjustment of the lens 32 to freely control high order of the sixth power or higher of the moving radius R. Accordingly, this embodiment uses an Alvarez lens 31 to generate aberration having a shape of high order that exists in an actual aspheric surface.

The seventh embodiment thus provides the elastically deformable mirror 221 at the reference-light side, and the reference wave-front generating unit 3A at the object-light side, and uses aspheric wave fronts from both members to measure the aspheric surface shape of the target surface 5. In particular, the reference wave-front generating unit 3A at the object-light side generates spherical aberration and the fourth power (and higher orders accurately speaking) of the moving radius R. The Alvarez lens 31 produces a wave front of the sixth power of the moving radius R.

When the elastically deformable mirror 221 produces wave fronts of high order (of eighth power and higher of the moving radius R) at the reference-light side, similar to the sixth embodiment, the primary standard 222 and elastically deformable mirror 223 located at the datum plane position are used to alternate deform two elastically deformable mirrors 221 and 223. As a result, various aspheric surfaces may be measured.

Figure 16:
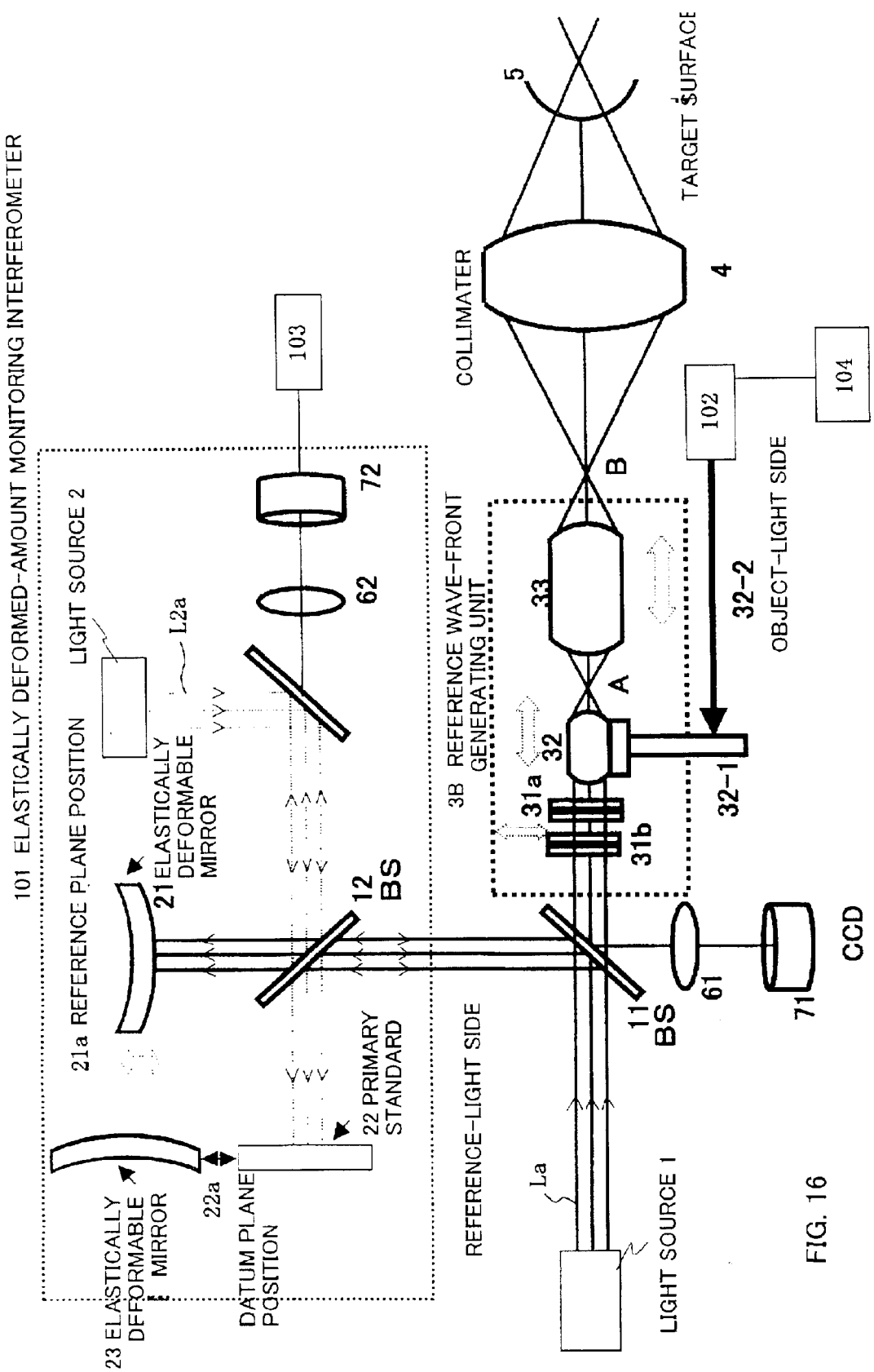
FIG. 16 is a schematic view showing essential parts in an aspheric-surface measuring interferometer of an eighth embodiment according to the present invention.

FIG. 16 shows a schematic view of essential parts of the eighth embodiment of the present invention. This embodiment has the same basic structure as that of the sixth and seventh embodiments. The eighth embodiment provides the elastically deformable mirror 221 at the reference-light side, and the reference wave-front generating unit 3B at the object-light side, and uses aspheric wave fronts from both members to measure the aspheric surface shape of the target surface 5. In particular, the eighth embodiment characteristically uses two Alvarez lenses 31a and 31b at the object-light side. Similar to the seventh embodiment, the number of Alvarez lenses to be inserted differs according to target aspheric surface shapes.

This embodiment uses the reference wave-front generating unit 3B, instead of the reference wave-front generating unit 3, to generate spherical aberration and control the yield of spherical aberration in proportion to the fourth power and higher of the moving radius R. In addition, the Alvarez lens 31a produces the wave fronts corresponding to the sixth power of the moving radius, while another Alvarez lens 31b produces the wave front in proportion to the eighth power of the moving radius R. The elastically deformable mirror 221 at the reference-light side produces wave fronts of high order of tenth power and higher. Thereby, various aspheric surfaces may be measured. Similar to the sixth embodiment, offsets for the reference positions of the Alvarez lenses 31a and 31b may be calculated by realizing a similar reference state using the lenses 32, 33, collimator 4, and the reference spherical surface and then by inserting Alvarez lenses.

Similar to the sixth embodiment, when the elastically deformable mirror 221 at the reference-light side produces wave fronts of high orders (i.e., tenth power and higher of the moving radius R), the primary standard 222 and elastically deformable mirror 223 located at the datum plane position are used to alternately deform two elastically deformable mirrors 221 and 223, whereby the elastically deformable mirror 221 finally creates a desired wave front.

Figure 17:
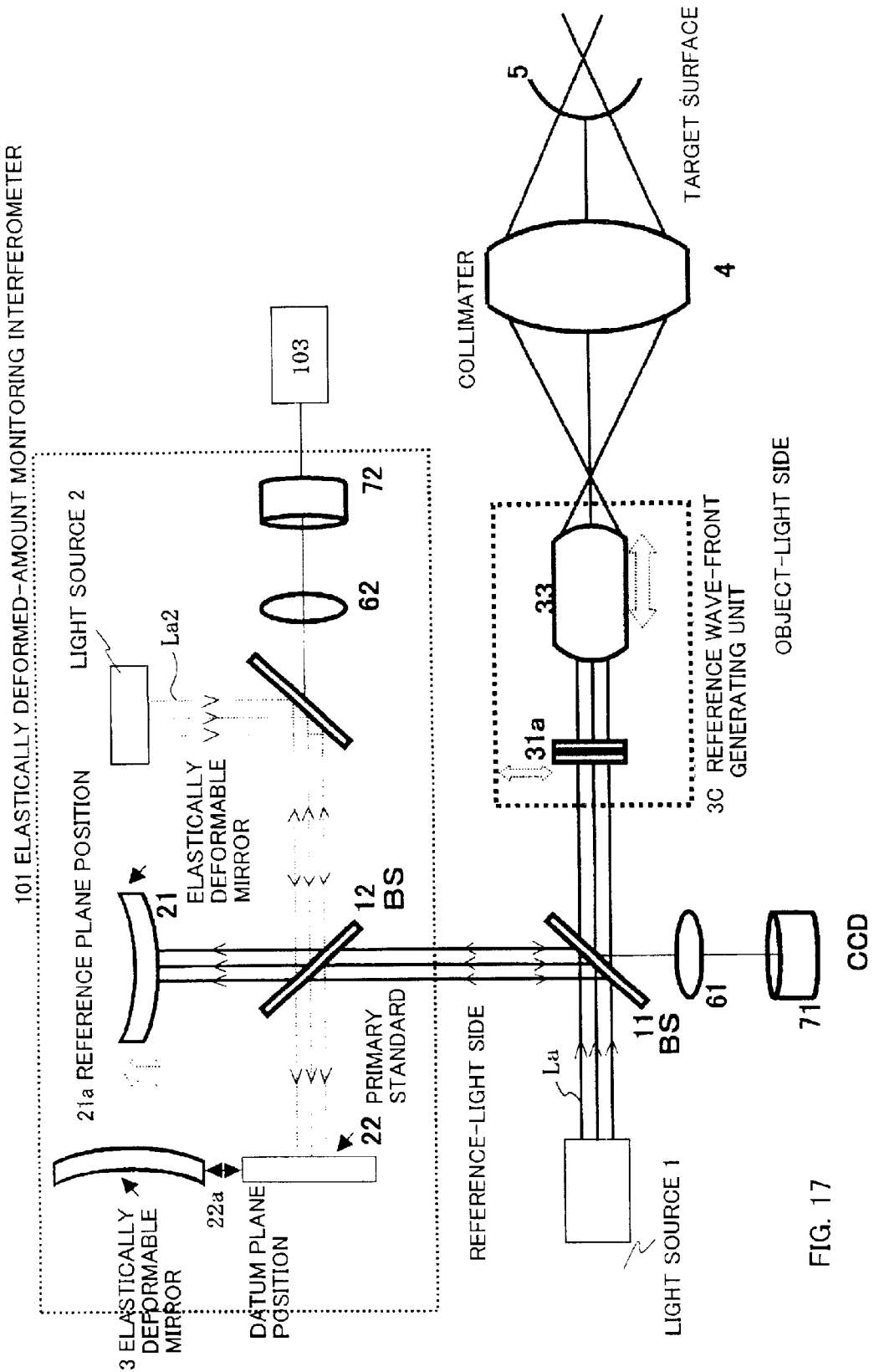
FIG. 17 is a schematic view showing essential parts in an aspheric-surface measuring interferometer of a ninth embodiment according to the present invention.

FIG. 17 shows a schematic view of essential parts of the ninth embodiment of the present invention. This embodiment has the same basic structure as that of the sixth and seventh embodiments. This embodiment provides the elastically deformable mirror 221 at the reference-light side, and the reference wave-front generating unit 3C at the object-light side, and uses aspheric wave fronts from both members to measure the aspheric surface shape of the target surface 5. This embodiment makes the Alvarez lens 31a at the object-light side generate aberration of the fourth power of the moving radius R.

This embodiment uses the reference wave-front generating unit 3C, instead of the reference wave-front generating unit 3, and the lens 33 serves to form an image using a collimated beam without aberration. As illustrated, the Alvarez lens 31a controls the yield of spherical aberration in proportion to the fourth power of the moving radius R. Similar to the sixth embodiment, an offset for the reference position of the Alvarez lens may be calculated by realizing a similar reference state using the lenses 32, 33, collimator 4, and the reference spherical surface and then by inserting Alvarez lens 31a.

Similar to the sixth embodiment, when the elastically deformable mirror 221 at the reference-light side produces wave fronts of high orders (i.e., sixth power and higher of the moving radius R), the primary standard 222 and elastically deformable mirror 223 located at the datum plane position are used to alternately deform two elastically deformable mirrors 221 and 223, whereby the elastically deformable mirror 221 finally creates a desired wave front.

As discussed, some embodiments of the present invention provides a system or primary standard and two elastically deformable mirrors for deforming a wave front at the reference-light side, and the reference wave-front generating unit at the object-light side, adjusts and synthesizes wave fronts, and thereby produces various reference wave fronts for various aspheric surface shapes. Since the apparatus itself may be used as a reference and thus a master standard. Each embodiment of the present invention variably controls a wave front generated as a reference with high precision, and flexibly measures various aspheric shapes. In addition, this flexible interference measurement method may provide the same accuracy as the spherical-surface measurement, and easily measure aspheric surfaces.

Moreover, each embodiment of the present invention may easily manufacture aspheric optical element, which has existed as a designed value but its actual process has been difficult. In particular, an EUV or any other optical system that requires strict accuracy and restricts the number of available elements may use such an aspheric optical element as has not hitherto been difficulties. In addition, each embodiment of the present invention is applicable to aspheric surfaces in exposure apparatuses in a range of conventional UV, DUV, and VUV as well as EUV. An optical system that has increased flexibility with an aspheric surface provides a large effect to semiconductor exposure apparatuses. Of course, an application of inventive aspheric surfaces is applicable not only to semiconductor exposure apparatuses, but also to other optical apparatuses. An optical element manufactured using one of the interferometers of the above embodiments is applicable to a projection optical system in a projection exposure apparatus, which exposes a pattern formed on a first object (or reticle) on a second object (or wafer). Thereby, a projection optical system with high optical performance is manufactured easily.

An application of aspheric surfaces according to the embodiments is not limited to the semiconductor exposure apparatuses, but is applicable to other optical devices as well.

Thus, the present invention provides an interferometer and an interference measurement method, which are able to measure an aspheric shape with accuracy similar to that of the spherical-surface measurement, and properly measure various surface shapes. In addition, the present invention provides an exposure apparatus using an optical element manufactured by using the above interferometer or the interference measurement method.

What is claimed is:

1. A measuring system for measuring a surface shape of an object to be measured, comprising:
   an object measuring interferometer having;
   a deformable reference surface; and
   a first light receiving element which receives light from the object and the deformable reference surface as an interference signal; and
   a reference surface measuring interferometer having;
   a datum surface; and
   a second light receiving element which receives light from the deformable reference surface and the datum surface as an interference signal,
   wherein said first and second light receiving element receives interference signals simultaneously.

2. A measuring system according to claim 1, wherein said deformable reference surface is an elastically deformable mirror which has a variable surface shape.

3. A measuring system according to claim 1, wherein a shape of the datum plane is invariable.

4. A measuring system according to claim 2, wherein said datum surface is an elastically deformable mirror which has a variable surface shape.

5. A measuring system according to claim 3, wherein said deformable reference surface and said datum surface deforms alternately while the interference signal is received by the second light receiving element.

6. A measuring system according to claim 1, wherein said datum surface includes plurality of primary standards.

7. A measuring system according to claim 1, wherein a wavelength of the light received by the first light receiving element is the same as that of the light received by the second light receiving element.

8. A measuring system according to claim 1, wherein a wavelength of the light received by the first light receiving element is different from that of the light received by the second light receiving element.

9. A measuring system according to claim 1, further comprising a reference wave front generating unit which produces a wave front as a measurement reference of the surface shape of the object.

10. A measuring system according to claim 8, wherein said wave front produced by the reference wave front generating unit is an aspheric wave front.

11. A measuring system according to claim 8, wherein said reference wave front generating unit generates fourth order components of a moving radius of a wave front, while said deformable reference surface generates sixth order and higher components of the moving radius of a wave front.

12. A measuring system according to claim 8, wherein said reference wave front generating unit includes a spherical aberration generating part.

13. A measuring system according to claim 8, wherein said reference wave front generating unit includes an Alvarez lens.

* * * * *